United States Patent [19]
Kondo

[11] Patent Number: 5,585,942
[45] Date of Patent: Dec. 17, 1996

[54] IMAGE PICKUP APPARATUS

[75] Inventor: Makoto Kondo, Yokohama, Japan

[73] Assignee: Canon Kabushiki Kaisha, Tokyo, Japan

[21] Appl. No.: 461,546

[22] Filed: Jun. 5, 1995

Related U.S. Application Data

[63] Continuation of Ser. No. 900,582, Jun. 18, 1992, abandoned.

[30] Foreign Application Priority Data

Jun. 20, 1991 [JP] Japan ................... 3-148441
May 20, 1992 [JP] Japan ................... 4-152910

[51] Int. Cl.$^6$ ............... H04N 5/00; H04N 5/228
[52] U.S. Cl. .............. 358/474; 358/448; 348/230; 348/297
[58] Field of Search ................ 358/21 R, 23, 358/29, 24, 31, 36, 41, 42, 44, 60, 64, 80, 85, 148, 153, 158, 213.26, 213.27, 310, 134, 209, 330, 335, 450, 448, 462, 674, 228.75, 906, 909; 328/63.55, 155, 72, 137, 67, 65

[56] References Cited

U.S. PATENT DOCUMENTS

| | | | |
|---|---|---|---|
| 3,662,096 | 5/1972 | Morton | 178/7.35 |
| 4,661,844 | 4/1987 | Rufry et al. | 358/23 |
| 4,703,369 | 10/1987 | Moriyama et al. | 358/343 |
| 4,757,264 | 7/1988 | Lee et al. | 328/63 |
| 4,763,204 | 8/1988 | Kinoshita et al. | 358/335 |
| 4,827,341 | 5/1989 | Akimoto et al. | 358/148 |
| 4,910,606 | 3/1990 | Kinoshita et al. | 358/335 |
| 5,019,895 | 5/1991 | Yamamoto et al. | 358/36 |
| 5,028,993 | 7/1991 | Kobori et al. | 358/78 |
| 5,032,928 | 7/1991 | Sakai et al. | 358/448 |
| 5,051,818 | 9/1991 | Mishima | 358/31 |
| 5,097,348 | 3/1992 | Suetaka | 358/335 |
| 5,134,487 | 7/1992 | Taguchi et al. | 358/209 |
| 5,153,929 | 10/1992 | Itagaki | 382/65 |
| 5,185,658 | 2/1993 | Shinomiya | 358/29 |
| 5,185,659 | 2/1993 | Itagaki et al. | 358/44 |
| 5,191,426 | 3/1993 | Kochi | 358/213.18 |
| 5,258,828 | 11/1993 | Sano et al. | 358/29 |
| 5,331,411 | 7/1994 | Kawakami et al. | 348/708 |
| 5,333,010 | 7/1994 | Nakamura et al. | 348/263 |

FOREIGN PATENT DOCUMENTS

| | | |
|---|---|---|
| 89095771 | 6/1982 | Japan . |
| 89015375 | 1/1983 | Japan . |
| 1-320876 | 12/1989 | Japan . |
| 1-320872 | 12/1989 | Japan . |

*Primary Examiner*—Paul Ip
*Attorney, Agent, or Firm*—Fitzpatrick, Cella, Harper & Scinto

[57] ABSTRACT

An image pickup apparatus includes an image pickup section for focusing an object image, a read-out circuit for repeatedly reading out some or all of image data obtained by the image pickup section during an exposure time interval, and a measuring circuit for integrating the image data during the exposure time interval to measure an exposure amount. The image pickup apparatus also includes a processor for interrupting the integration operation of the measuring circuit and processing the integration data as image data when the measurement value of the measuring circuit reaches a predetermined level.

25 Claims, 30 Drawing Sheets

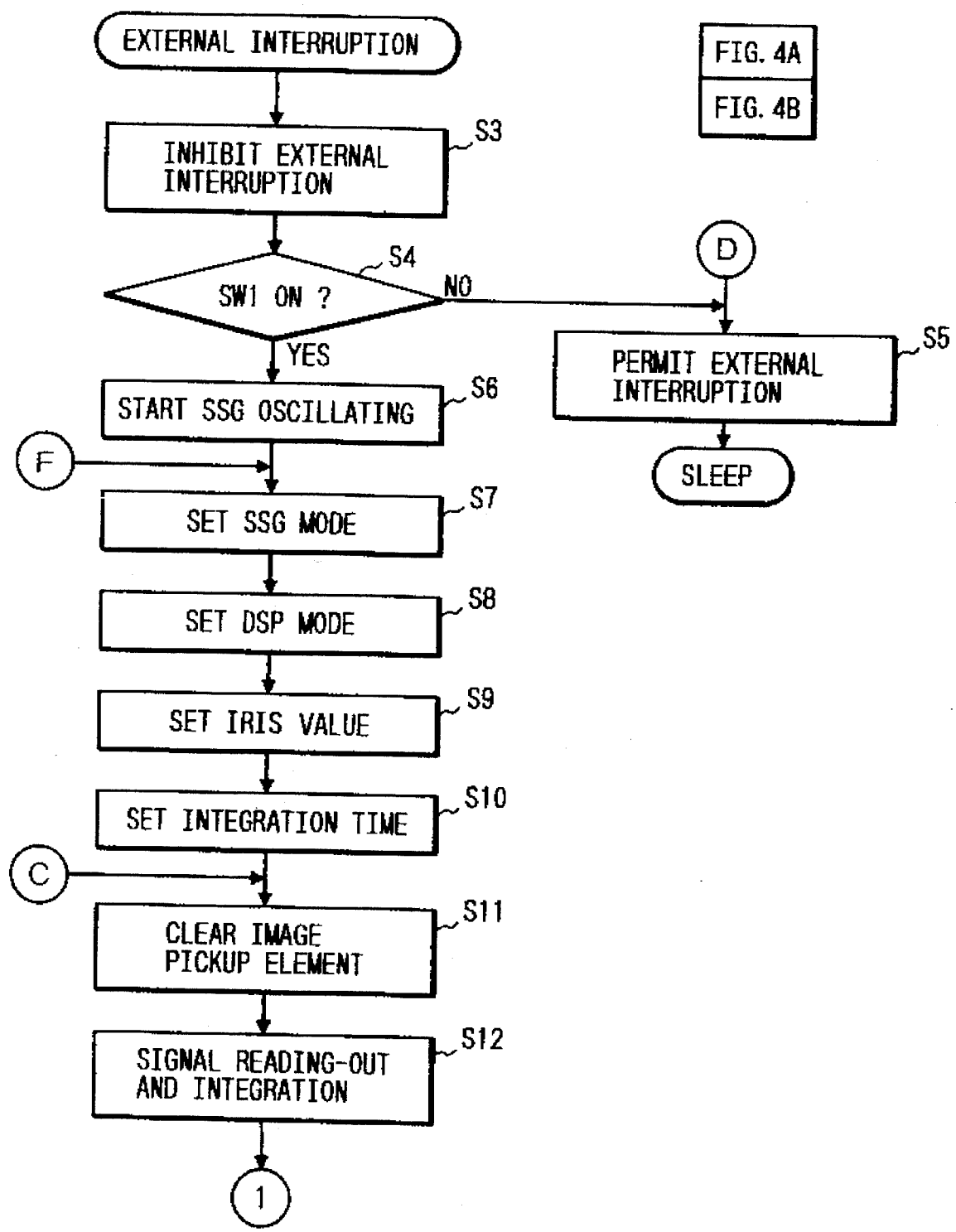

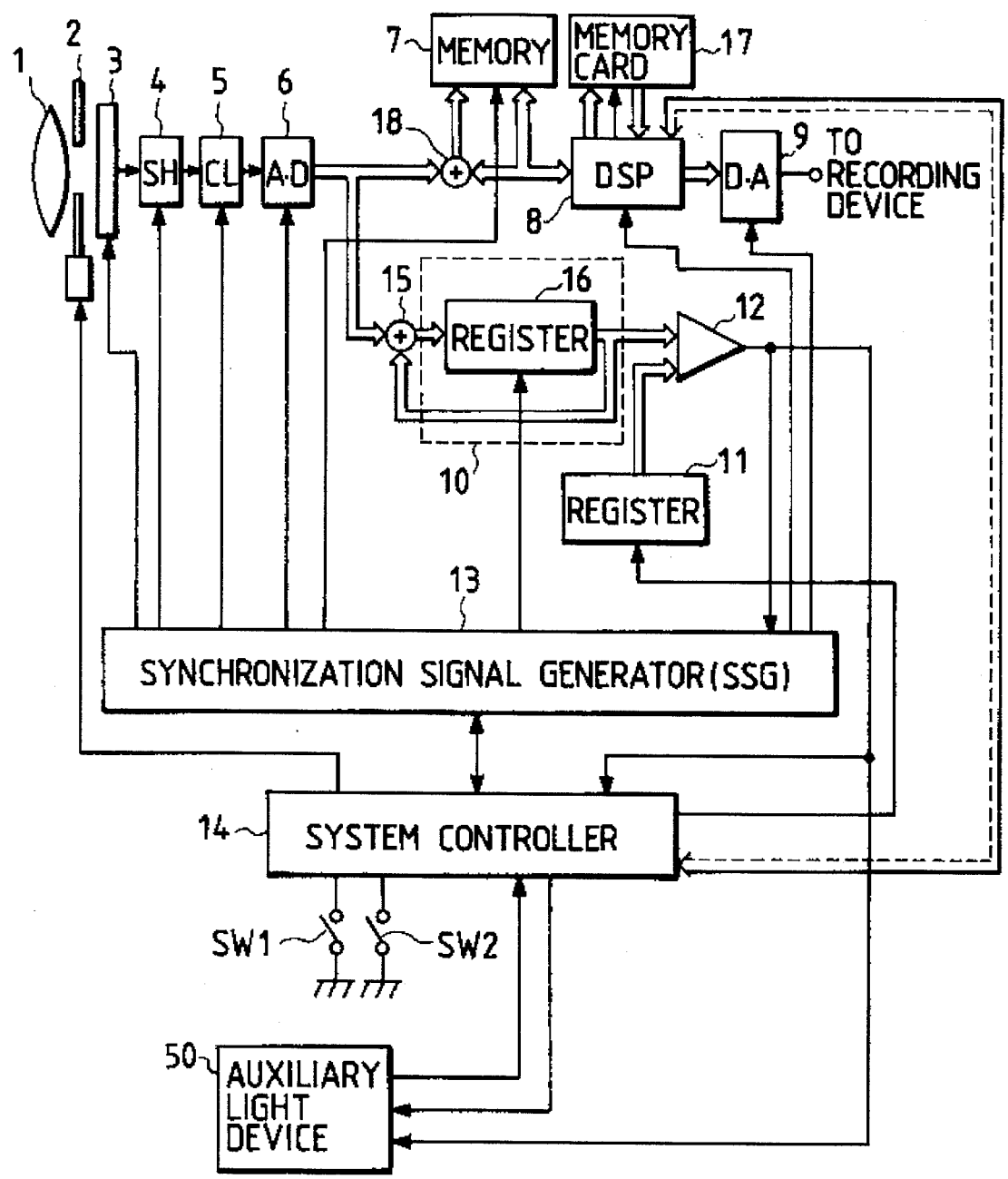

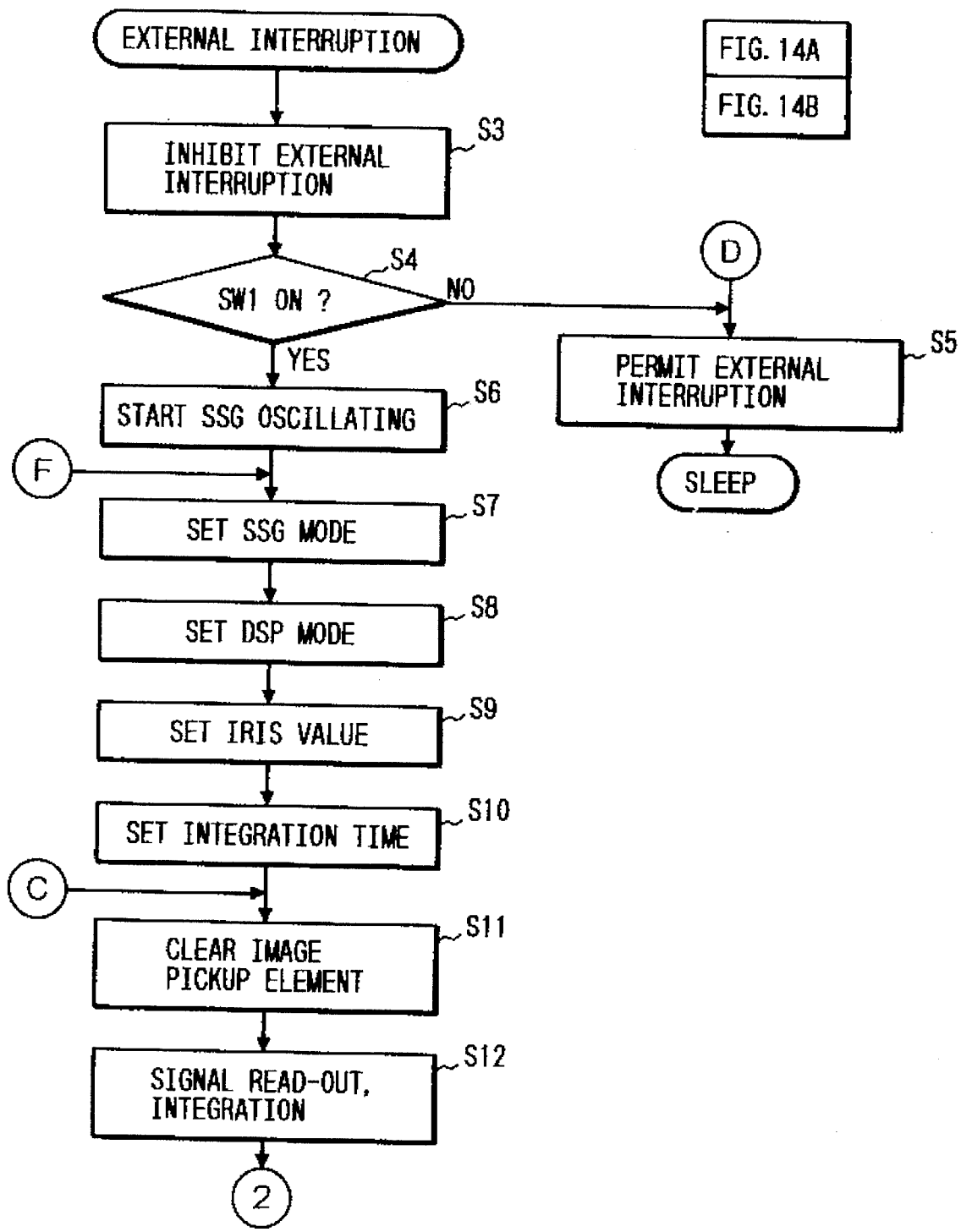

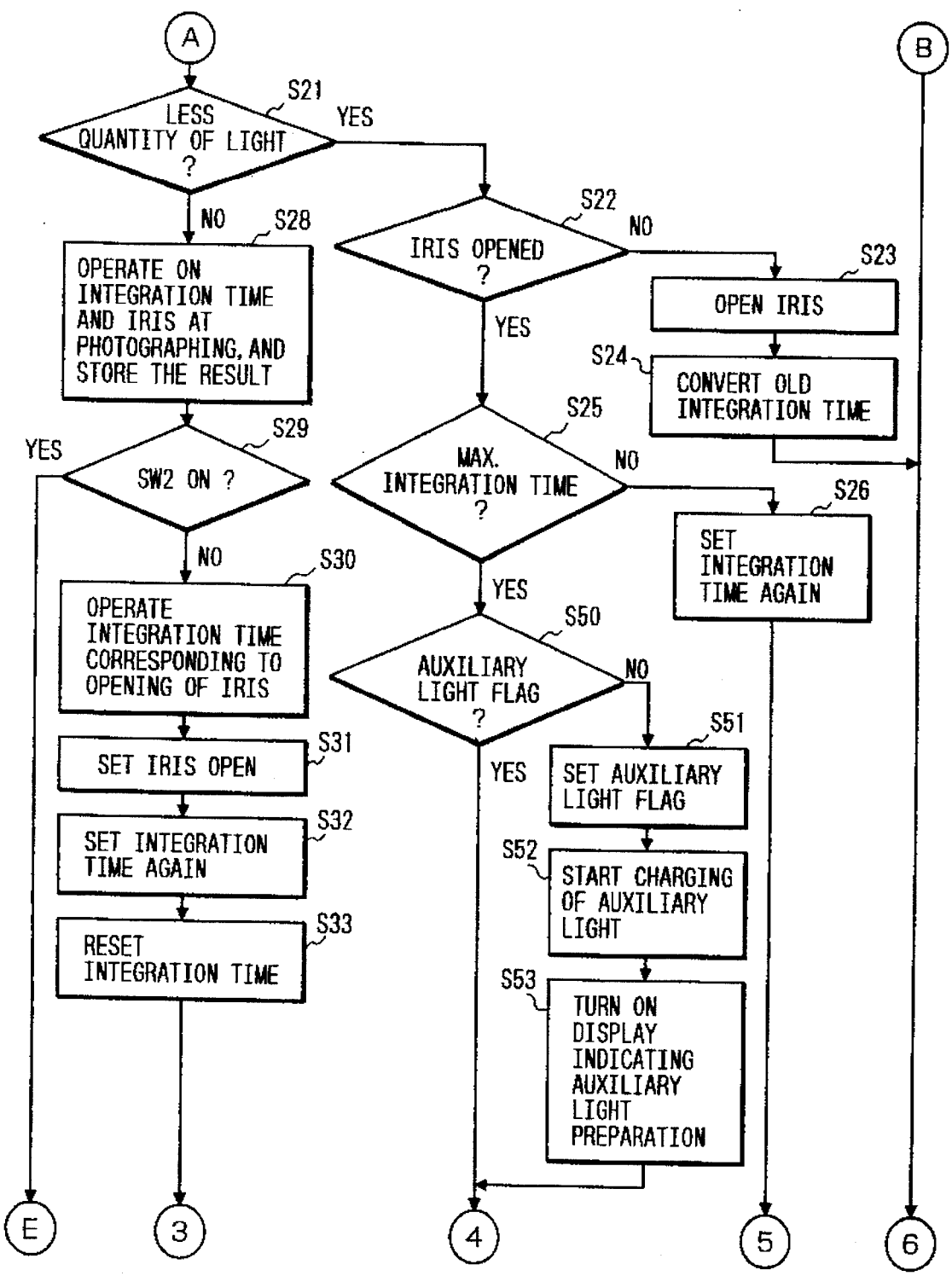

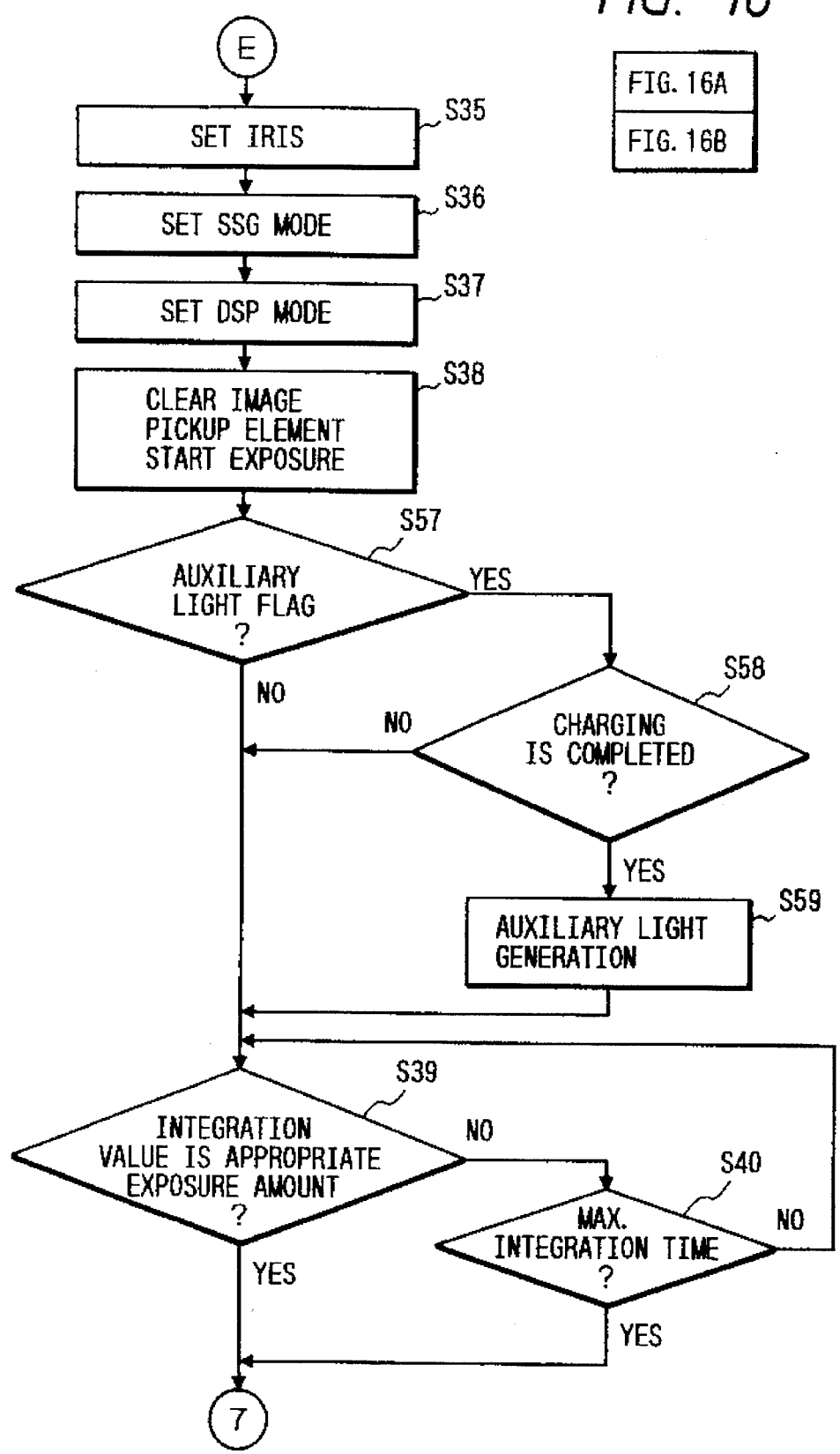

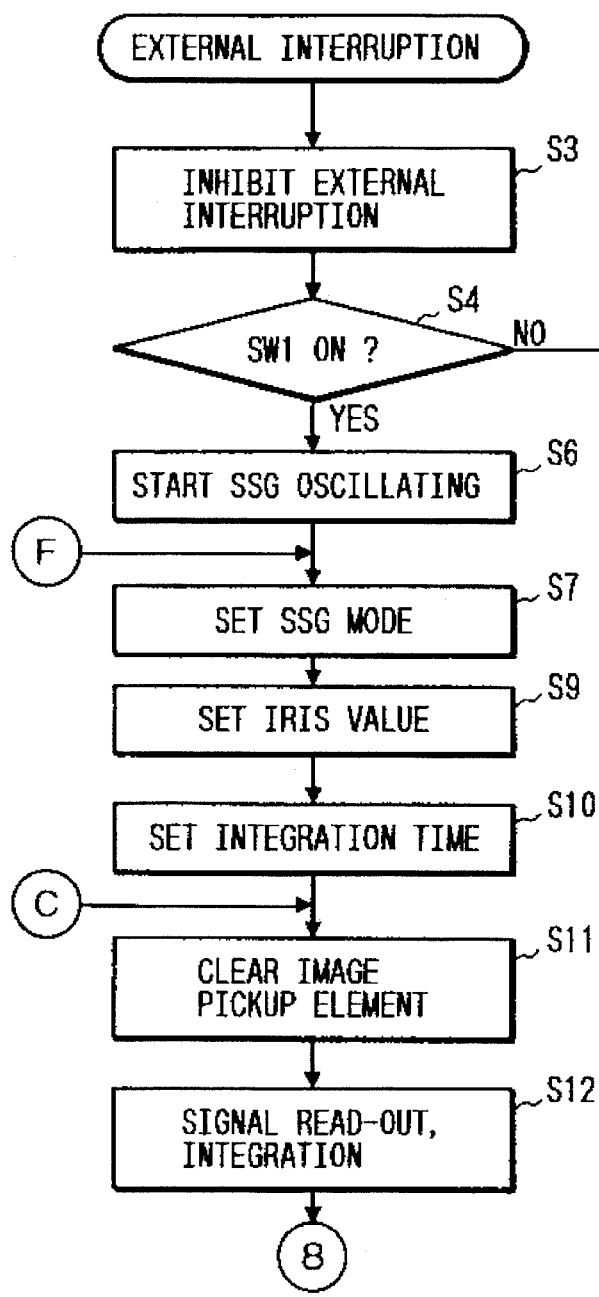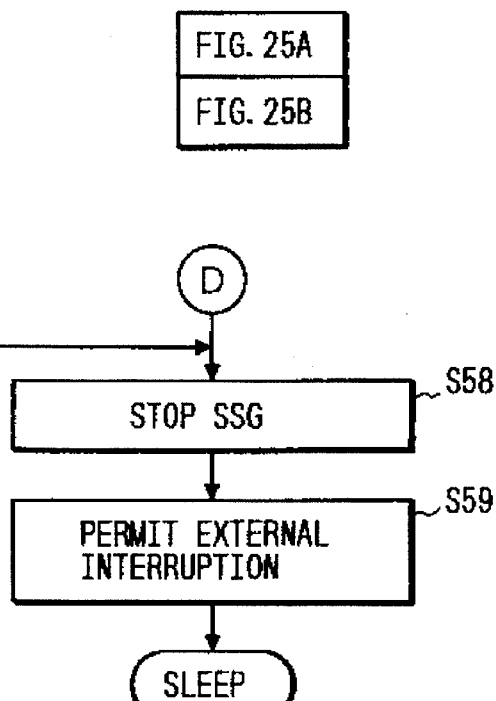
FIG. 25A
FIG. 25
| FIG. 25A |
| FIG. 25B |

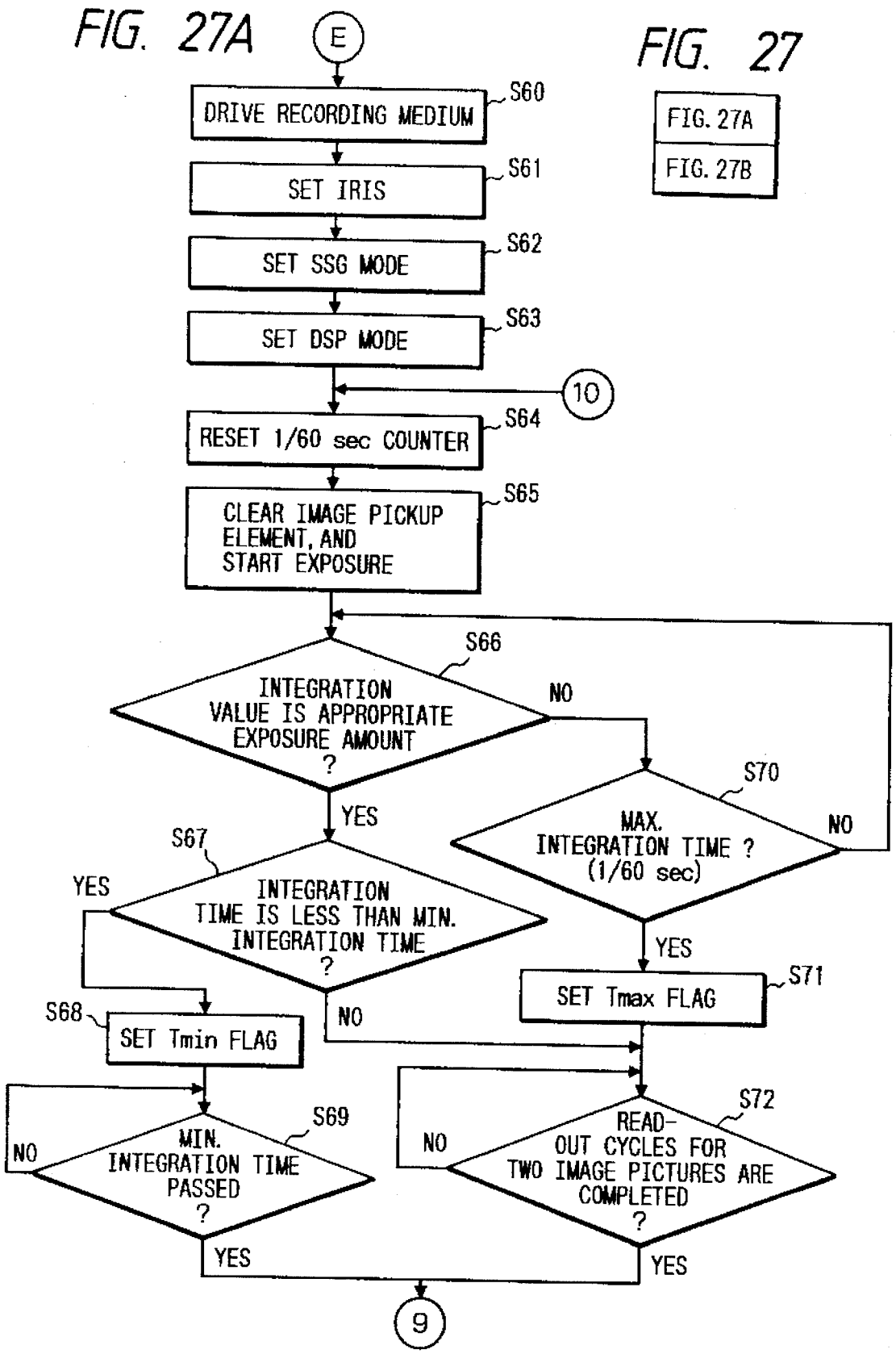

IMAGE PICKUP APPARATUS

This application is a continuation of application Ser. No. 07/900,582, filed Jun. 18, 1992 now abandoned.

BACKGROUND OF THE INVENTION

1. Field of the Invention

The present invention relates to an image pickup apparatus and, more particularly, is suitably applied to an image pickup apparatus for determining an appropriate exposure amount from output information from an image pickup means.

2. Related Background Art

FIG. 1 is a block diagram showing a schematic arrangement of a conventional image pickup apparatus having a solid-state image pickup element as an image pickup sensor.

Referring to FIG. 1, image pickup light from an object to be photographed passes through an image pickup optical system 1 and is guided to an image pickup element 3 serving as an image pickup sensor through an iris 2. The light is converted into an electrical signal by this image pickup element 3.

Image information represented by the converted electrical signal is input to an A.D (analog-to-digital) converter 6 through a sample-and-hold (SH) circuit 4 and a clamp (CL) circuit 5. The image information is converted into a digital signal by the A.D converter 6. The digital signal is stored in a memory 7.

A digital signal processor (DSP) 8 reads out image information stored in the memory 7 and performs predetermined signal processing. The processed data is sent to a D.A (digital-to-analog) converter 9.

The image information converted to an analog signal by the D.A converter 9 is sent to a recording device (not shown) through an output terminal $T_{OUT}$ and is recorded as a video signal. At this time, the respective components after the image pickup element 3 are operated in synchronism with timing signals output from a synchronization signal generator (SSG) 30. The operations of the synchronization signal generator 30, the iris 2, and a photometry sensor 31 are controlled by a system controller 32.

The above image pickup apparatus comprises the exclusive photometry sensor 31. The photometry sensor 31 measures the luminance of the object to be photographed, and the measurement result is transmitted to the system controller 32. The system controller 32 calculates an appropriate degree of opening of the iris 2 and a storage time of a signal charge of the image pickup element 3 on the basis of the above measurement result. The system controller 32 then controls the iris 2 in accordance with the calculated values and at the same time causes the synchronization signal generator 30 to control the image pickup element 3. Therefore, a good image of the object can be obtained in an appropriate exposure amount.

When a sufficiently large exposure amount cannot be obtained due to a low object luminance, an auxiliary light device 50 is operated. The auxiliary light device 50 sends a status signal to the system controller 32 to determine whether light can be generated by the auxiliary light device 50 when the device 50 is started to operate. When the system controller 32 determines that auxiliary light can be generated in an exposure state of a low object luminance, an auxiliary light emission signal is sent from the system controller 32 to the auxiliary light device 50.

A modulated light control device 51 stops light emission of the auxiliary light device 50. The modulated light control device 51 integrates light from the object from the start of light emission of the auxiliary light device 50 and at the same time sends a light emission stop signal for the auxiliary light when the integration value reaches a predetermined value. Upon reception of the light emission stop signal, the auxiliary light device 50 stops light emission.

The above image pickup apparatus has a separate photometry sensor. In recent years, a technique for repeatedly reading out and integrating signals from the image pickup sensor (image pickup element) prior to exposure and causing a system controller 32 to determine an integration result to calculate an appropriate iris value and a charge storage time has been proposed.

Examples of the above technique are disclosed in Japanese Laid-Open Patent Application Nos. 1-320872 and 1-320876. In addition, methods using special sensors are also proposed in Japanese Laid-Open Patent Application Nos. 57-95771 and 58-15375.

In a conventional image pickup apparatus of the type described above, a photometry sensor is required in a normal operation. For this reason, means for adjusting a sensitivity difference between photometry and image pickup sensors, a difference between a light reception angle and a screen angle, and a difference in spectral sensitivity are required. The resultant arrangement is complicated and expensive. At the same time, a space is required for mounting a photometry sensor resulting in a bulky apparatus.

When an image pickup sensor also serves as a photometry sensor, photometry is performed by the above sensor to determine an iris value and a sensor charge storage time, and then exposure is performed. The image pickup sensor cannot therefore cope with a difference in object luminance between the photometric operation and the exposure operation. For this reason, when an object having a high luminance is moved in or out of the image pickup area upon the start of exposure, or an object is a light-emitting element which changes such as are which flickers, blooming occurs due to the signal charge overflow in the sensor. A decisive problem may occur in addition to slight overexposure or underexposure.

In Japanese Laid-Open Patent Application No. 57-95771, a nondestructive read-out image pickup element which can cope with a change in object luminance after the start of exposure is used. However, even if the nondestructive read-out element is used, destructive read-out must be performed to obtain an image having a practically sufficiently high quality. Therefore, this element cannot be used in practical applications without any modifications.

In order to achieve the above arrangement, an image pickup element must have an exclusive photometry read-out circuit.

An exclusive photometry read-out circuit is required in Japanese Laid-Open Patent Application No. 58-15375 as in Japanese Laid-Open Patent Application No. 57-95771. In addition, in this case, some pixels are read out for photometry. Of all image data read out upon completion of the photometry, data of pixels having already been read out for photometry are displayed in black, resulting in inconvenience.

SUMMARY OF THE INVENTION

The present invention has been made in consideration of the above situation, and has as its object to provide an image pickup apparatus in which an exclusive photometry sensor need not be arranged to simplify the arrangement and achieve low cost and compactness, and at the same time, changes in object luminance upon the start of exposure can be appropriately coped with, and an optimal object image can always be obtained.

An image pickup apparatus of an embodiment of the present invention comprises image pickup means for focusing an object image, read-out means for repeatedly reading out part or all of image information obtained by the image pickup means during an exposure time interval, and measuring means for integrating the image information during the exposure time interval to measure an exposure amount. The image pickup apparatus further comprises processing means for stopping an integration operation of the measuring means and processing integration information as image information when a measurement value of the measuring means reaches a predetermined level.

In the image pickup apparatus of this embodiment, part or all of the image information obtained by the image pickup means during the exposure time interval is repeatedly read out, and this image information is integrated by the measuring means during the exposure time interval, thereby measuring the exposure amount.

An image pickup apparatus according to another embodiment of the present invention comprises image pickup means for picking up an object image, read-out means for repeatedly reading out part or all of image information obtained by the image pickup means during an exposure time interval, measuring means for integrating the image information to measure an exposure amount during the exposure time interval, and means for detecting that a measurement value of the measuring means reaches a predetermined level, and means for illuminating the object, wherein the illuminating means is stopped on the basis of an output from the detecting means when the object luminance is low.

BRIEF DESCRIPTION OF THE DRAWINGS

FIG. 13 is a block diagram showing an arrangement of the fourth embodiment of the present invention;

DETAILED DESCRIPTION OF THE PREFERRED EMBODIMENTS

Figure 1:
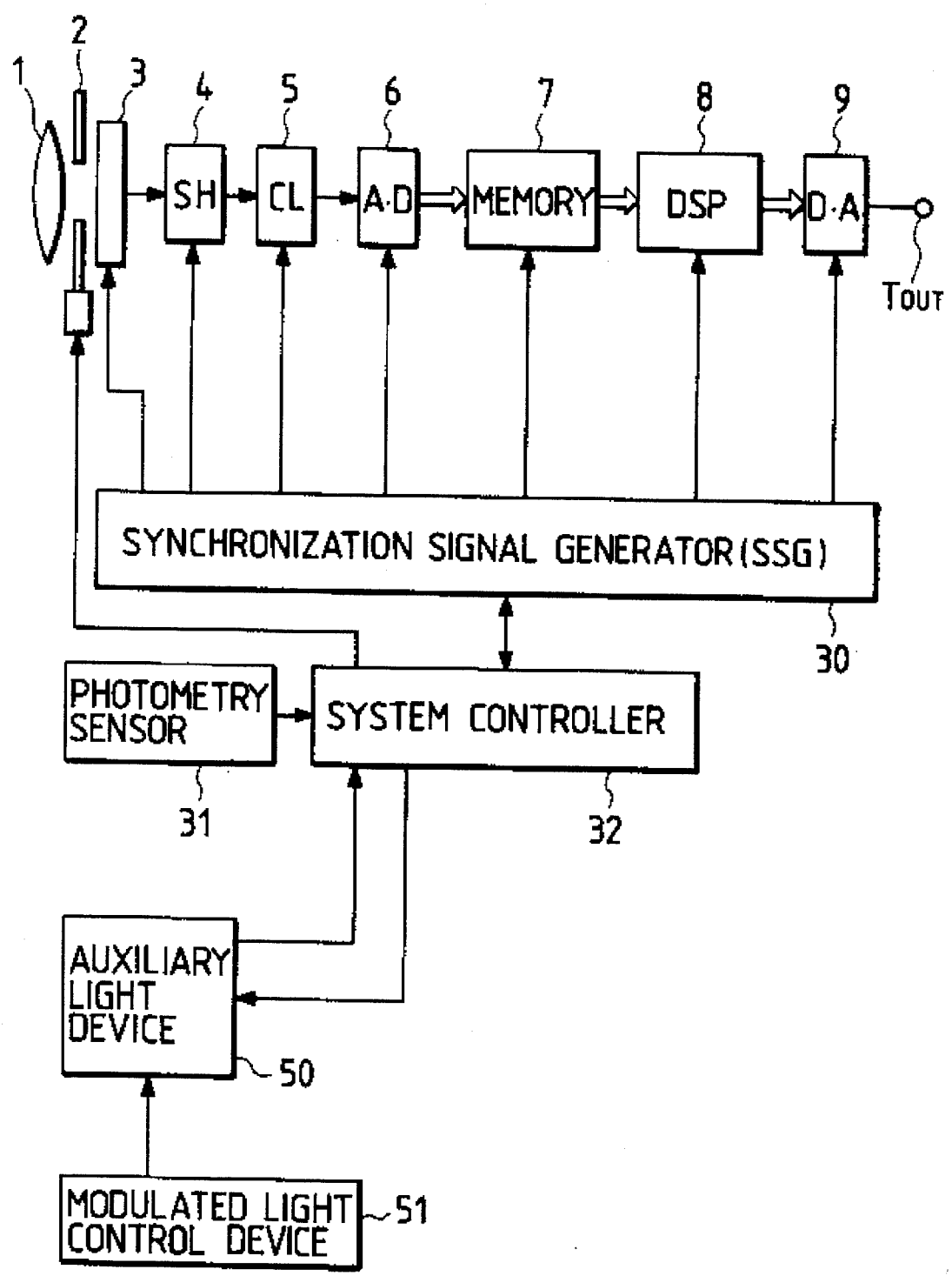
FIG. 1 is a block diagram showing an arrangement of a conventional apparatus.
Figure 2:
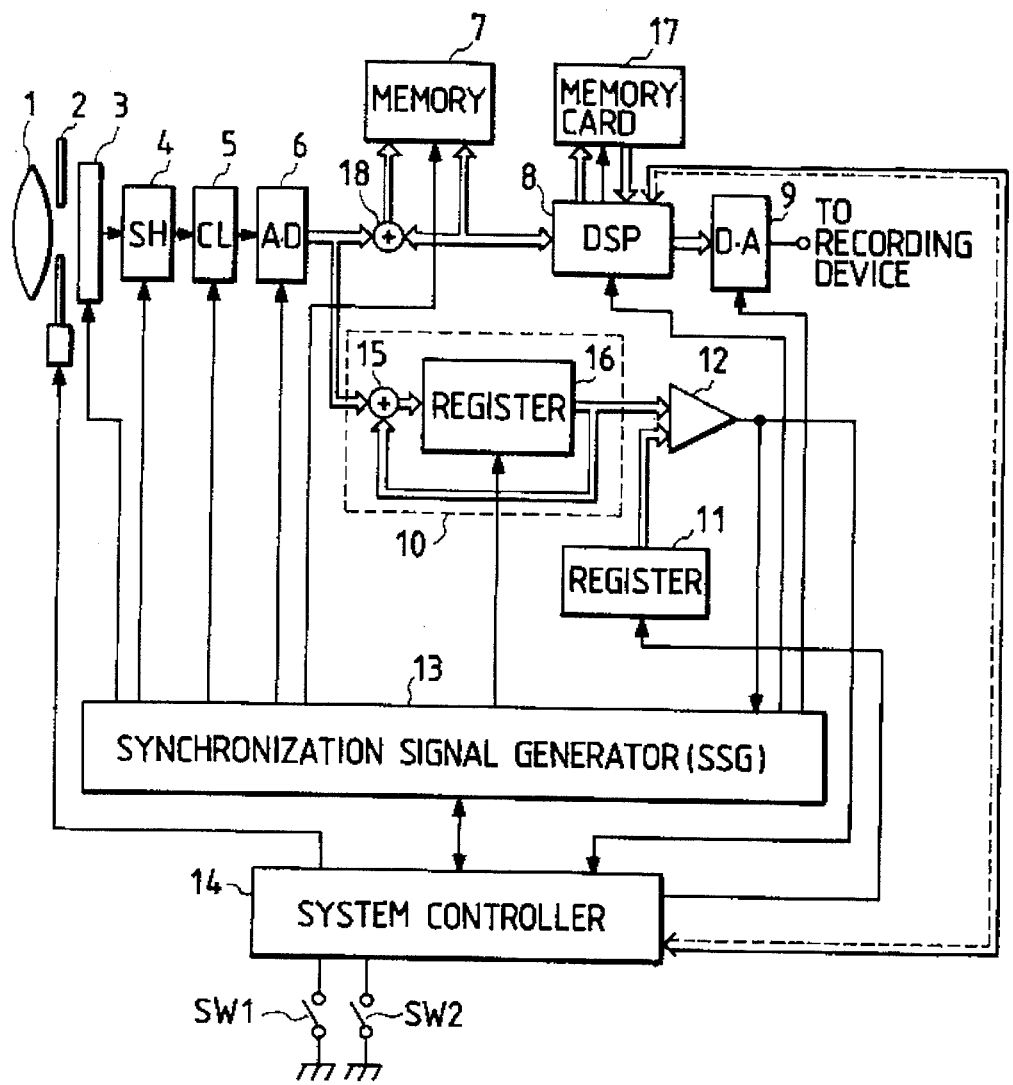
FIG. 2 is a block diagram showing an arrangement of the first embodiment of the present invention.

FIG. 2 is a block diagram showing an arrangement of an image pickup apparatus according to the first embodiment of the present invention. The same reference numerals as in FIG. 1 denote the same parts in FIG. 2. The image pickup apparatus includes an image pickup optical system 1, an iris 2, an image pickup element (image pickup means) 3, a sample-and-hold circuit (to be referred to as an SH circuit hereinafter) 4, a clamp (CL) circuit 5, an A-D converter 6, a memory 7, a digital signal processor (to be referred to as a DSP hereinafter) 8, and a D-A converter 9. The iris 2 has an actuator to control the quantity of incident image pickup light. The image pickup element 3 photoelectrically converts, into an electrical signal, image pickup light incident on and reflected by an object and received through the image pickup optical system 1 and the iris 2. The SH circuit 4 samples an image signal (image information) output from the image pickup element 3 and eliminates a reset pulse from the image signal. The clamp circuit 5 fixes the DC level of the image signal. The A-D converter 6 converts an analog image signal into a digital signal. The memory 7 temporarily stores the image signal converted as the digital signal. The DSP 8 performs various image processing while reading out the image signals stored in the memory 7. For example, the DSP 8 performs filtering, emphasis, compression, and the like. In addition, the DSP 8 writes the image signal on a memory card 17 and reads out it therefrom (this control includes memory mode control and memory address control). The D-A converter 9 converts the image signal read out from the memory 7 or the memory card 17 and processed by the DSP 8 into an analog signal. The image signal converted as the analog signal is sent to a recording device (not shown) and is recorded as a video signal.

The image pickup apparatus also includes an integrator 10, a register 11, a comparator 12, a synchronization signal generator (to be referred to as an SSG hereinafter) 13, a system controller 14, an adder 18, a switch SW1, and a switch SW2. The integrator 10 integrates the image signal converted into the digital signal. The integrator 10 comprises an adder 15 and a register 16 for latching an output from the adder 15. The register 11 holds data supplied from the system controller 14. The system controller 14 controls the iris 2, the SSG 13, and the DSP 8 and receives, as control information, information associated with the image signal from the DSP 8, status information of the DSP 8, and status information of the SSG 13. The SSG 13 supplies timing signals (clock pulses) required for reading out and processing the image signals to the image pickup element 3, the SH circuit 4, the clamp circuit 5, the A-D converter 6, the memory 7, the DSP 8, the D-A converter 9, and the register 16 in the integrator 10. The comparator 12 compares the output (integration value) of the integrator 10 with the contents of the register 11. The adder 18 adds the data stored in the memory 7 to the data from the image pickup element 3. The switch SW1 is turned on when a release button (not shown) is depressed to the first stroke. The switch SW2 is turned on when the release button is depressed to the second stroke.

The DSP 8 constitutes a read-out means for reading out part or all of the image signal output from the image pickup element 3 during an exposure time interval. The integrator 10 constitutes a measuring means for integrating the image information during the exposure time interval and measuring an exposure amount. The system controller 14 constitutes a processing means for stopping the integration operation of the integrator 10 and processing the integration information as image information when a photometry value (integration value) from the integrator 10 reaches a predetermined level equal to that of the data stored in the register 11.

Thick lines (double lines) in the signal lines in FIG. 2 represent parallel digital lines, a combination of a broken line and a solid line (thin line) represents a digital data line, and thin lines (solid lines) represent control lines.

Figure 3:
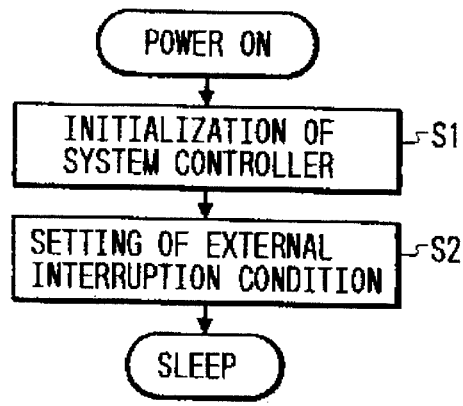
FIG. 3 is a flow chart showing an initialization operation of an image pickup apparatus shown in FIG. 2.
Figure 4B:
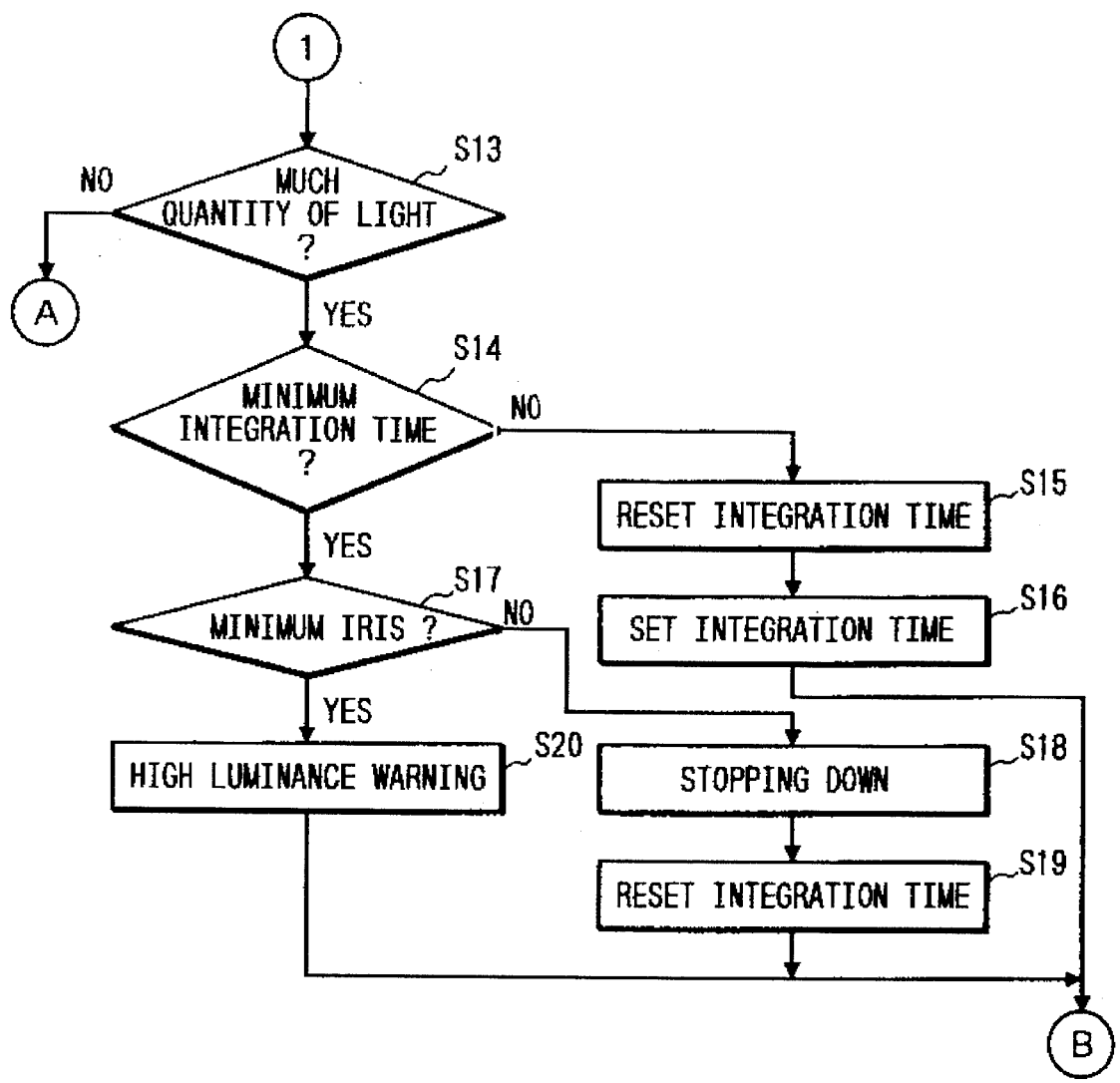
FIG. 4 is a flow chart showing a processing operation of the image pickup apparatus shown in FIG. 2.
Figure 5:
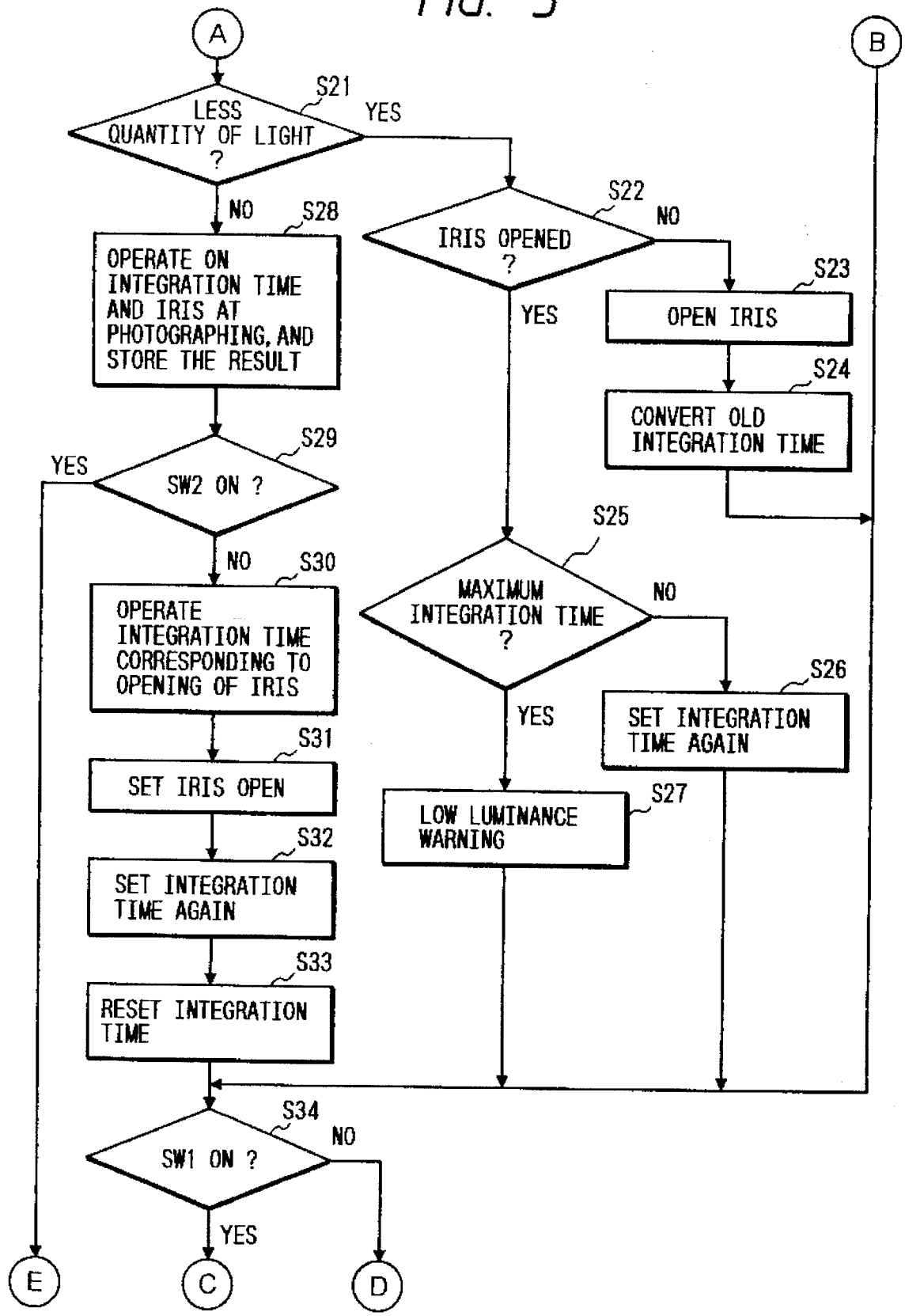
FIG. 5 is a flow chart showing another processing operation of the image pickup apparatus shown in FIG. 2.
Figure 6:
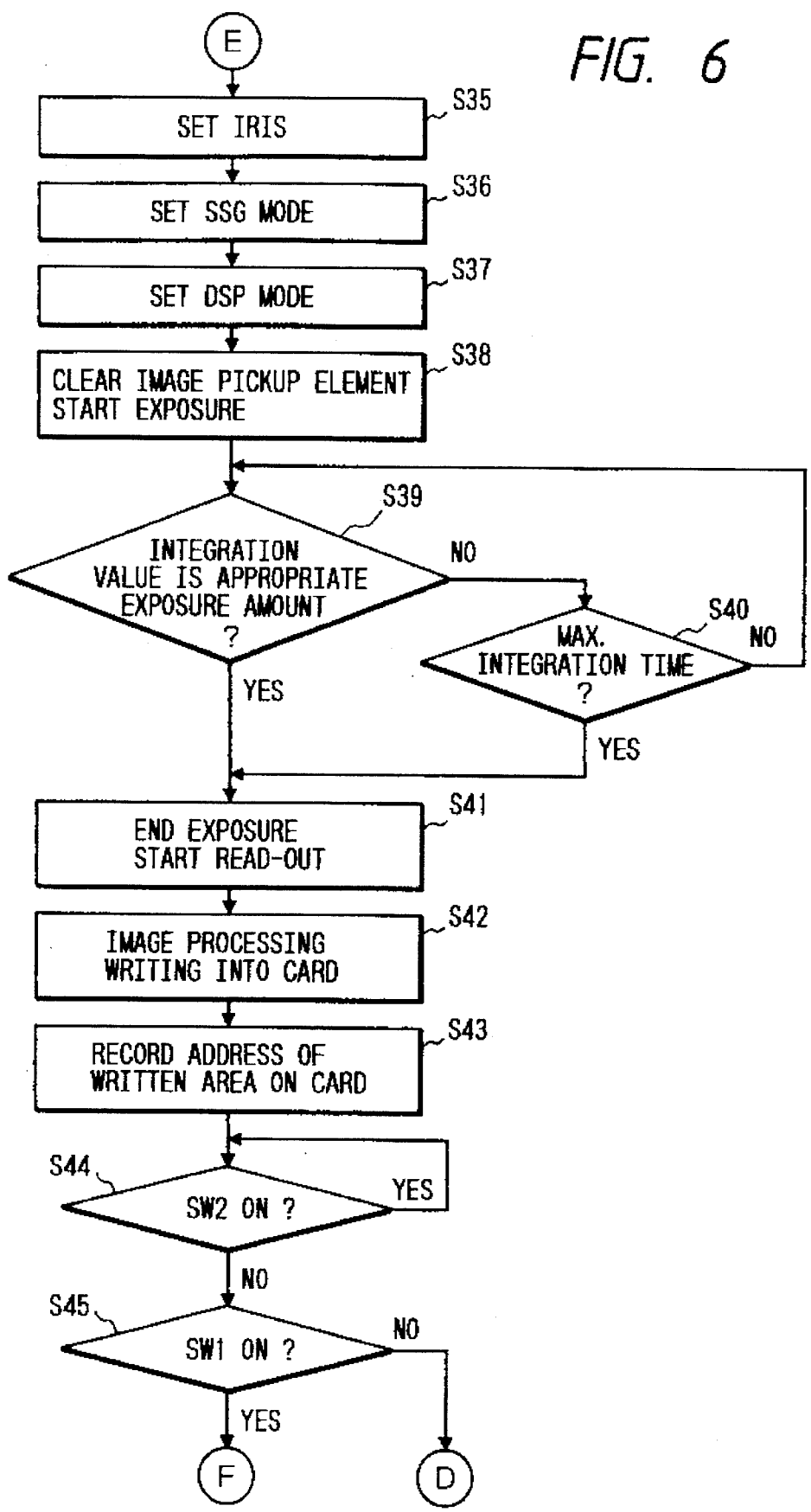
FIG. 6 is a flow chart showing still another processing operation of the image pickup apparatus shown in FIG. 2.

Operations of the image pickup apparatus arranged as described above will be described with reference to flow charts in FIGS. 3 to 6. FIG. 3 is a flow chart showing an initialization operation, and FIGS. 4 to 6 are flow charts of normal image pickup operations. Connectors A to F represent connection points between the flow charts. These flow chart operations are controlled by the system controller 14.

When a main switch (not shown) of the system is turned on, the system controller 14 is started to operate. The internal states (registers and counters) of the system controller 14 are initialized (S1) upon the start of the system controller 14. The initialization operations include setting of an external interruption condition by the switch SW1 (S2). After these operations are completed, the system controller 14 is set in a waiting mode (sleep mode) for waiting for an external interruption to reduce power consumption.

In this state, when the switch SW1 is turned on, a processing routine in an external interruption mode is started by hardware of the system controller 14. In this routine, an external interruption is inhibited (S3). The system controller 14 determines whether this interruption is generated by turning on the switch SW1 (S4). If this interruption is not generated by the switch SW1 (i.e., the interruption may be generated by noise or the like), an external interruption condition is set again, and the sleep mode is set (S5). However, when the switch SW1 is determined to be ON, a power is supplied to the SSG 13, the DSP 8, the SH circuit 4, the clamp circuit 5, and the A-D converter 6 to start oscillating the SSG 13 (S6).

A mode for causing the SSG 13 and the DSP 8 to perform a photometry operation is set (S7 and S8). A value of the iris 2 of the optical system and an integration time of the image pickup element 3 which is controlled by the SSG 13 are set (S9 and S10). After these preparatory setting operations are completed, an unnecessary charge stored in the image pickup element 3 is cleared (removed) (S11). Image signal reading-out and integration are started (S12). At this time, the integration time is controlled by the SSG 13. When exposure is performed by the set time, the image signal is read out from the image pickup element 3 and is integrated (added) in the form of digital values by a necessary quantity in the DSP 8. The system controller 14 receives the sum of the necessary quantity (i.e., an 8-bit average value obtained by dividing the sum of the 8-bit data obtained in units of pixels by the number of pixels) from the DSP 8 and determines on the basis of the reception data whether the exposure amount is appropriate (S13 and S21).

The system controller 14 determines whether the quantity of light is a much quantity of light in accordance with whether the quantity of light has a value larger than a predetermined value (S13). The system controller 14 determines whether the quantity of light is a less quantity of light in accordance with whether the quantity of light has a value smaller than a given value different from that in step S13 (S21).

If YES in step S13, the system controller 14 determines whether the integration time is a minimum integration time (S14). At this time, if NO in step S14, the accumulated integration time is reset (S15), and a new integration time is set again (S16). However, if YES in step S14, the system controller 14 determines whether the iris is a minimum iris (S17). If NO in step S17, stopping down control is performed (S18), and the accumulated integration time is reset (S19). However, if YES in step S17, high luminance warming is performed (S20).

In steps S13 and S21, when the quantity of light is determined to be neither too much quantity of light nor too little quantity of light, the quantity of light is regarded as an appropriate quantity of light. An object luminance is calculated in accordance with the corresponding iris value of the optical system, the corresponding integration time, and sensitivity data of the image pickup element 3 which is input in advance. A combination of an iris value and an integration time (exposure time in the image pickup mode) which are predetermined in correspondence with the calculated object luminance is stored for a future photographic operation (S28). If the quantity of light is determined in step S13 not to be too much quantity of light and is determined in step S21 to be too little quantity of light, the system controller 14 determines whether the iris is open (S22). If NO in step S22, the system controller 14 opens the iris to increase the quantity of light (S23). The old integration time is converted to a value corresponding to a new iris value (S24). When the iris is determined to be fully open and the iris cannot be further opened, the system controller 14 determines whether the integration time is a maximum integration time (S34) and sets again to increase the integration time (S26). When the iris is open and integration is performed by the time corresponding to the maximum integration time in the exposure mode, a warning representing that this condition falls outside the maximum photographic range of this image pickup apparatus is performed, that is, low luminance warning is performed (S27).

Adjustment of the iris and the integration time in the photometry loop (S11 to S34) in FIGS. 4 and 5 is not limited to the order of these steps. In this embodiment, in order to shorten the one-cycle time of the photometry loop, when the quantity of light is too much, the integration time is shortened and the iris is closed after the minimum integration time is set. However, when the quantity of light is too little, the iris is fully opened and the integration time is prolonged after the fully open iris is obtained. The maximum integration time in the photometry mode must be shorter than the maximum integration time in the image pickup mode, as a matter of course. In this case, a decrease in sensitivity, which is caused by the shorter integration time in the photometry mode than the integration time in the image pickup mode, can be compensated by an increase in gain of a signal processing system, an increase (the sum is divided not by the number of pixels, but by a number smaller than the number of pixels) of a coefficient for obtaining an average value in the DSP 8, or the like. In this case, since the operation does not aim at obtaining pixels, a decrease in S/N ratio does not pose any problem (since integration is performed, the S/N ratio can be increased as compared with an operation using one pixel). The old integration time is converted into a new iris value in step S24 due to the following reason. When the quantity of light is too little, the value of the quantity of light integrated within one cycle of the photometry loop is not wasted but added to the integration value in the next cycle. For this reason, when the object is bright, the integration time is measured every cycle of the photometry loop (for this purpose, the accumulated integration time is reset in steps S15 and S19). However, when the object is dark, the integration time is not reset every cycle but is accumulated.

Opening/closing of the iris and changes in integration time in the photometry cycle are preferably preformed to change the degree of opening/closing and the degree of changes in integration time in accordance with the integration value and the accumulated integration value in the previous photometry cycle (not by a comparison with single values). For example, when the previous accumulated integration value is slightly smaller than a value corresponding to the appropriate level, the iris is opened by one step (1 EV) and at the same time the integration time is reduced to ½. When the previous accumulated integration value is much smaller (larger) than the value of the appropriate level, the iris can be fully opened (stopping down), and the integration time can also be prolonged (shortened).

As a result of processing of the photometry loop, when the iris value and the integration time (in other words, a luminance value of the object) which correspond to an appropriate quantity of light are determined, an iris and an integration time in the image pickup mode are calculated and stored (S28). Thereafter, the ON/OFF state of the switch SW2 is checked (S29). At this time, if the switch SW2 is ON, image pickup processing from step S35 in FIG. 5 is started. However, if the switch SW2 is OFF, an integration time for setting appropriate exposure for the fully open iris is calculated (S30), and then the iris is fully opened (S31). Thereafter, the integration time is set again to be the integration time calculated in step S30 (S32). The accumulated integration time (a counter for measuring a total integration time in a plurality of cycles of the photometry loop when the object is dark) is reset (S33). The ON/OFF state of the switch SW1 is checked (S34). At this time, if the switch SW1 is ON, the flow returns to the start of the photometry loop. However, when the switch SW1 is OFF, an interruption condition is set again to return to the sleep mode. When the object is so bright that the calculation result in step S30 represents a time shorter than the minimum integration time in the fully open iris state, the iris is set to have an iris value for setting the integration time to be the minimum integration time, as a matter of course. The above loop is repeated while the switch SW1 is ON and the switch SW2 is OFF.

In this embodiment, when the object luminance does not allow appropriate exposure, an image pickup operation cannot be performed. However, when the quantity of light is too little, an image pickup operation may be easily performed in a fully open iris state for the maximum exposure time. However, when the quantity of light is too much, an image pickup operation may be easily performed in a minimum iris state for the minimum integration time.

In the above loop, after a combination of an iris and an integration time which can provide appropriate exposure in the image pickup mode is obtained, when the switch SW2 is detected to be ON (S29), the above image pickup processing is started. At this time, as shown in FIG. 6, the iris calculated in step S28 is set (S35), and the SSG 13 and the DSP 8 are set in the image pickup mode (S36 and S37). When these image pickup preparation operations are completed, the SSG 13 is controlled to remove (clear) the unnecessary charge from the image pickup element 3 to start exposure for picking up the object image (S38). Thereafter, part of the image signal is read from the image pickup element 3 and is then integrated. The integration value is compared with the appropriate exposure value set in the register 11 in advance. The system controller 14 determines whether the integration value reaches the appropriate exposure amount (S39). If YES in step S39 and when the integration time reaches the maximum integration time in the image pickup mode (S40), the SSG 13 outputs an exposure end signal to designate the start of reading-out of the memory 7 (S41). During this period, reading-out of part of the pixel information from the image pickup element and writing of read-out pixel information at the corresponding addresses of the memory 7, and timing control of the integration of the quantity of light in the integrator 10 are controlled by the SSG 13. However, a detailed description of these control operations will be described later.

When writing of the image signal in the memory 7 is completed, the DSP 8 performs image processing such as filtering, edge emphasis, and compression while reading out the image data from the memory 7. At the same time, the DSP 8 writes the processed signal on the memory card 17 (S42). At this time, the processing for reading out the signal from the memory 7 may be performed such that the image signals may be read out from areas in which the signals have been written in the memory 7 before the read-out from the image pickup element 3 and writing of the read-out signals in the memory 7 are perfectly completed. The addresses of written area of the memory card 17 may be recorded on the memory card 17 (S43), thereby completing the image pickup operation.

The address of the written area of the memory card 17 is recorded on the memory card 17 to prevent the old recorded data from being lost by overwriting another data in the written area. In addition to recording of the address of the written area, if a recording order of memory areas is fixed, the next write address may be recorded. To the contrary, an address of a writable memory area may be recorded. Alternatively, an address representing a smaller one of the writable memory area and the written memory area may be recorded, and at the same time, a flag representing whether the address is a writable or written area may be recorded.

When the above image pickup processing is completed, the flow returns to the next image pickup preparation operation (photometry loop) when the switch SW2 is turned off (S44). In this case, when the switch SW1 is also OFF, an interruption waiting condition is set to set a sleep mode (S45). In this embodiment, an image pickup operation is performed frame by frame, and the next image pickup preparation operations are started when the switch SW2 is turned off. However, in an image pickup apparatus having a so-called continuous photographic mode, the image pickup mode may be repeated while the switch SW2 is kept on.

Figure 7:
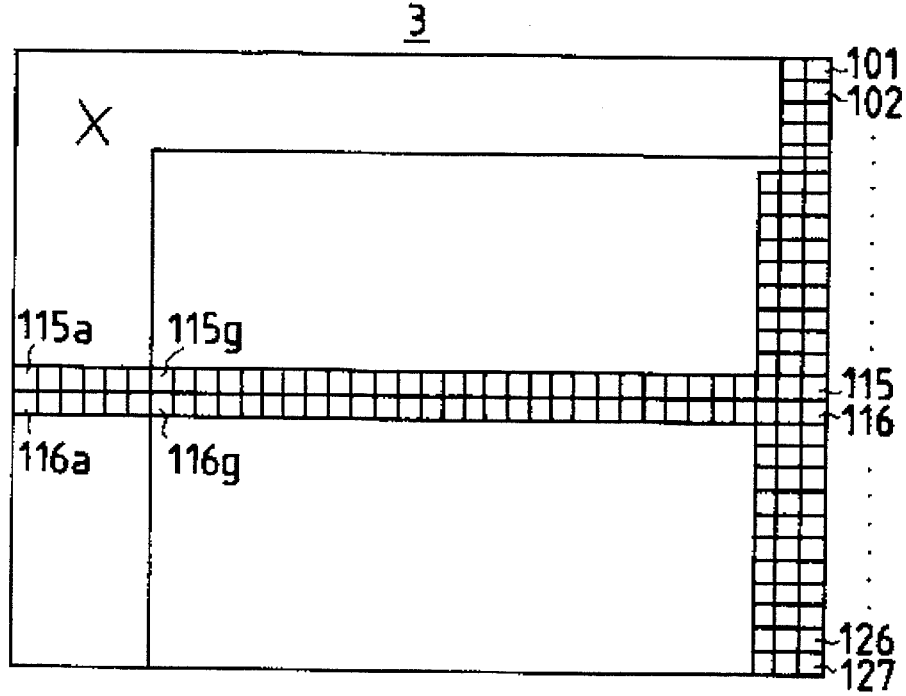
FIG. 7 is a view showing a pixel layout of an image pickup section of an image pickup element.

Detection of a period from the start to the end of an image pickup operation and timing control until the start of reading out the image signal will be described in detail with reference to FIGS. 7 and 8. FIG. 7 illustrates an image pickup section (photoelectric conversion section) of the image pickup element 3. Small squares represented by reference numerals 116a, 116b, ..., 116f, 116g, ... represent pixels, respectively. Scanning lines 101, 102, ..., 115, 116, ..., 126, and 127 are constituted by the pixels. An area X is an optical black area obtained by shielding the pixels to give a black level reference to the image pickup element 3. In this embodiment, the number of horizontal effective pixels is 30, and the number of vertical effective pixels is 22.5. The necessary number of pixels varies depending on different television schemes.

Figure 8:
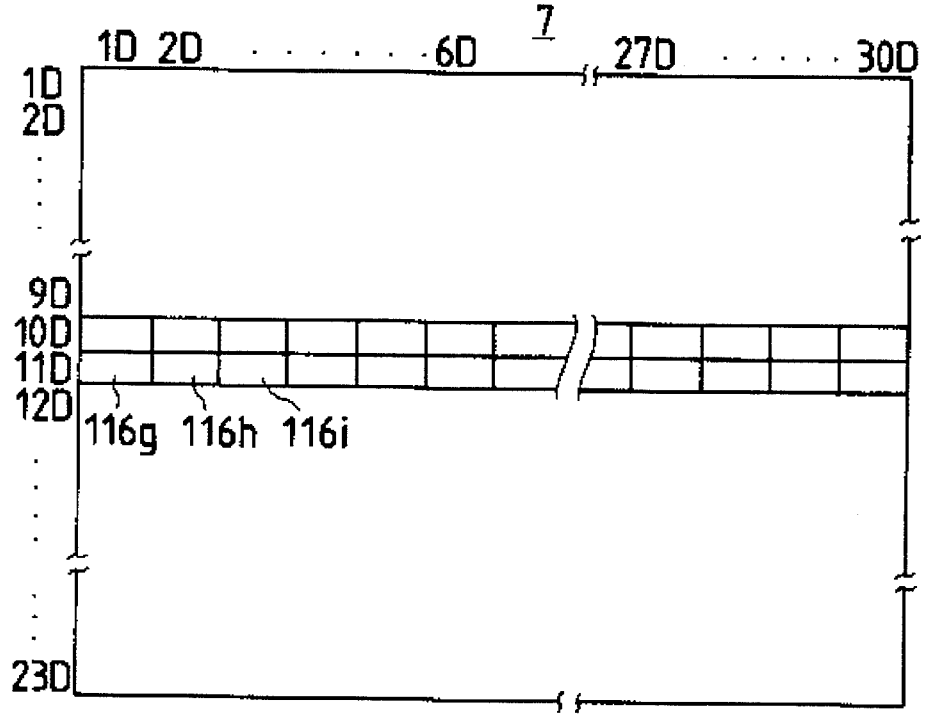
FIG. 8 is a view showing address allocation inside a memory.
Figure 9:
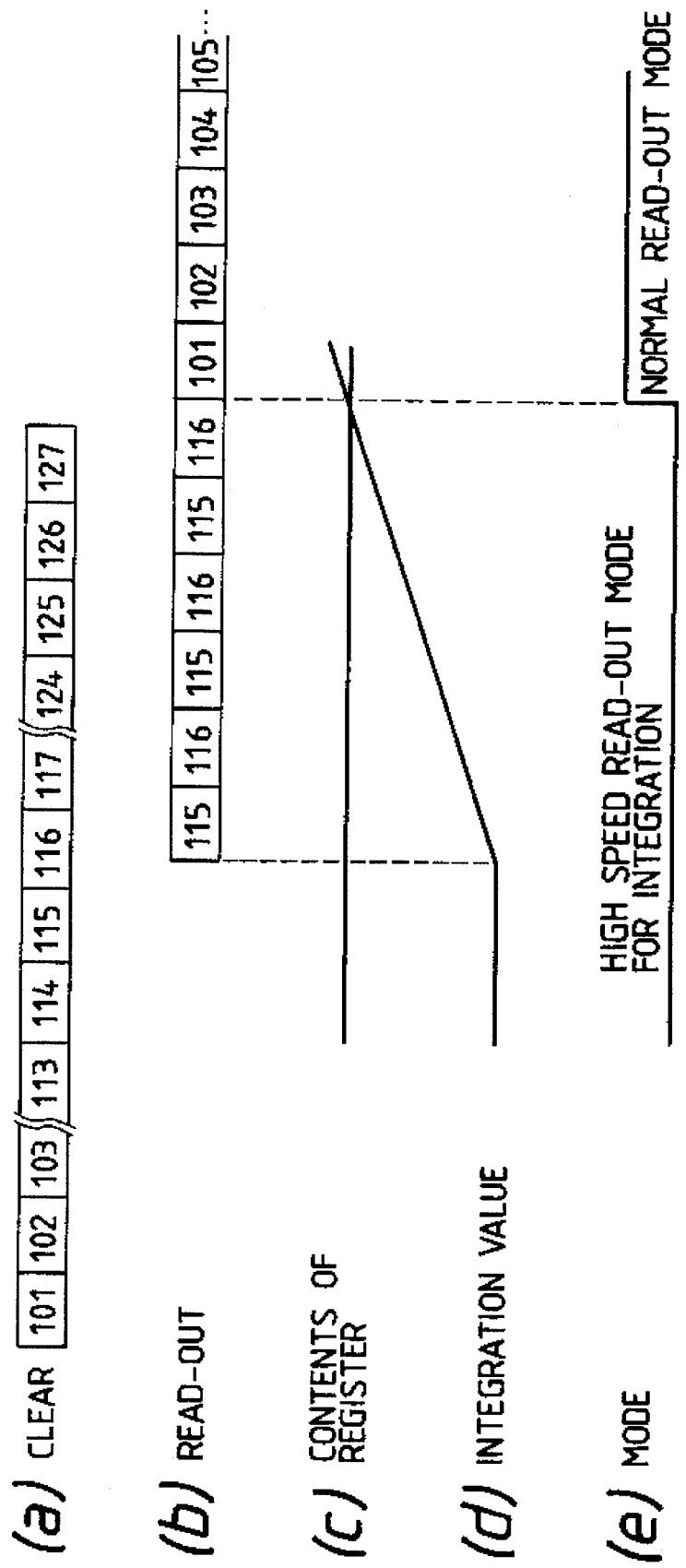
FIGS. 9(a) to 9(e) are timing charts showing an operation when a MOS sensor is used as the image pickup element.
Figure 10:
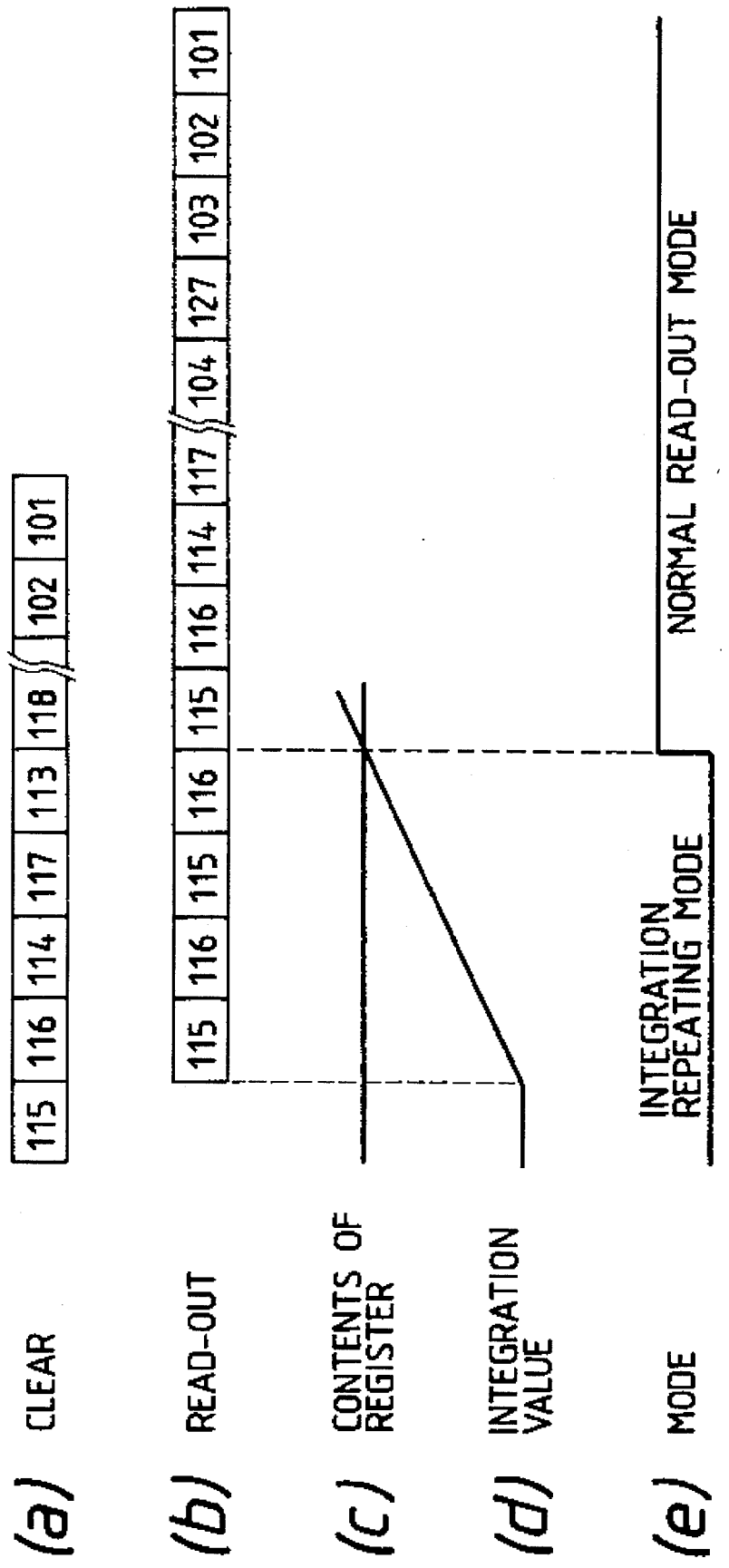
FIGS. 10(a) to 10(e) are timing charts showing an operation when the operation shown in FIG. 9(a) to 9(e) is improved.

FIG. 8 illustrates address allocation inside the memory 7. The size of the memory 7 is determined to store the data of the effective pixels of the image pickup element 3 in FIG. 7. As shown in FIG. 8, a portion represented by a vertical address 11D and a horizontal address 1D is allocated in advance to store data (i.e., a digital value corresponding to brightness) of the pixel 116g in FIG. 7. Similarly, the pixel 116h in FIG. 7 is allocated at the vertical address 11D and a horizontal address 2D, and the pixel 116i is allocated at the vertical address 11D and a horizontal address 3D. In this embodiment, the horizontal and vertical addresses can be independently set. In this case, one-dimensional addressing or three-dimensional addressing may be employed if random access is possible.

The exposure operation in the image pickup apparatus (FIG. 2) having the image pickup element 3 shown in FIG. 7, the memory 7 shown in FIG. 8, and the SSG 13 corresponding to the image pickup element 3 and the memory 7 will be described first.

The exposure is started with the removal of an unnecessary charge stored in the image pickup element 3. More specifically, if the image pickup element 3 is a MOS sensor, pixels are reset. If the image pickup element 3 is a CCD, sweeping of a charge to an OFD is started. This operation is performed when necessary clock pulses are supplied from the SSG 13 to the image pickup element 3. When clearing (removal of the charge) of the image pickup element 3 ends, the SSG 13 outputs timing signals to the image pickup element 3, a subsequent signal processing system, and the memory 7. The SSG 13 repeatedly reads out image signals from the pixels constituting the scanning lines 115 and 116.

Unnecessary reset pulses and the like are removed by the SH circuit 4 from the image pickup signal read out from the image pickup element 3. The optical black portions (115a to 115f and 116a to 116f) are clamped by the clamp circuit 5. The resultant image signal is converted into a digital signal by the A-D converter 6. This digital signal is supplied to the integrator 10 and the memory 7. At this time, the image signal free from the optical black portions is added to the value stored at a given address (FIG. 7) by the adder 18, and the sum is stored again at the given address. The register 16 in the integrator 10 does not receive the data while the optical black portions are kept input, so that only the effective pixels can be integrated. Therefore, pixel data of 60 pixels can be added by one read-out cycle in the integrator 10.

Light incident on the image pickup element 3 is integrated by the above processing (integration of pixel data of 60 pixels). The comparator 12 determines whether the resultant integration value becomes an appropriate level for the pixels of the image pickup element 3 and the dynamic range of the signal processing system. The value of the register 11 which is compared by the comparator 12 is set to be a value which is 60 times (i.e., a multiple corresponding to the number of pixels to be integrated) the appropriate level per pixel. This value may be varied in accordance with the photometry information prior to the start of the image pickup operation (e.g., the value may be changed in accordance with a deviation of the luminance in the integration area currently subjected to an image pickup operation from the average value of the luminances in the entire image pickup area).

Although it is easy to read out an image signal per scanning line in the MOS sensor, a special structure is required in the CCD (e.g., an FET sensor having a shift gate to a vertical transfer path in units of pixels). To the contrary, in the MOS sensor, since the image signal can be read out in units of scanning lines, reading-out of each scanning line is easy. In the MOS sensor, however, the clear timing must be shifted every scanning line to prevent exposure irregularity in consideration of a read-out timing error in each scanning line upon clearing (start of exposure) of the image pickup element.

In addition, in this embodiment, although the output from the register 16 is input to the comparator 12, a gate may be arranged between the register 16 and the comparator 12 to initiate a comparison operation in the comparator 12 upon completion of one scanning/read-out cycle (in units of 60 pixels in this embodiment). The appropriate exposure value need not be set to be a multiple of the number of pixels subjected to integration in the register 11. The same effect can be obtained when a coefficient unit for dividing an output from the register 16 into a fraction of the number of pixels is arranged between the output of the register 16 and the comparator 12 (i.e., a position where a feedback circuit to the adder 15 is not adversely affected).

When the system controller 14 determines on the basis of the comparison result from the comparator 12 that an integration value of the quantity of light incident on reference pixels (pixels to be read out and integrated, i.e., 60 pixels of the effective portion within the scanning lines 40 and 41 in this embodiment) becomes an appropriate value, the integration operation (i.e., read-out and integration of the reference pixels) is stopped in response to a signal from the SSG 13, and a read-out operation is immediately started. This read-out operation is performed as in the normal read-out operation such that sampling, clamping, and A-D conversion are performed in units of scanning lines, and the digital data are stored in the memory 7 at addresses predetermined in units of pixels. In particular, as for the reference pixels, the values are added to the values already stored at addresses subjected to write access, and the sums are stored at the same addresses (no problem occurs even if the values of all the pixels are added and the resultant sum is stored).

The image signal having an appropriate exposure amount has been stored in the memory 7 by the above operations. At this time, the reference pixels are limited to part of the entire image pickup area due to the following reason. When the above arrangement is to be obtained by using an existing image pickup element and an existing signal processing system, the read rate and the signal processing speed are limited. If the read rate of an image pickup element or the like is sufficiently high, reference pixels may be the pixels of the entire image pickup area. In this case, data input to the integrator 10 are weighted depending on pixel addresses, and the photometry sensitivity distribution can be changed.

A clearing sequence of the image pickup element 3 using a MOS sensor and its read-out sequence will be described with reference to FIGS. 9(a) to 10(e).

FIG. 9(a) to 9(e) are timing charts for explaining an operation performed when a time required to clear one scanning line and perform a normal read-out operation is different from a time required to read out one scanning line so as to integrate the image signal. In this case, the data are read out from the scanning lines downward in FIG. 7. As shown in FIG. 9(a), the scanning lines 101, 102, ..., 127 are cleared. When the scanning line 115 to be integrated is cleared, a read-out operation of the scanning line 115 is immediately started, as shown in FIG. 9(b). When clearing of the scanning line 116 is completed, a read-out operation of the scanning line 116 is performed. Subsequently, read-out operations of the scanning lines 115 and 116 are continuously performed. The read-out image data are accumulated at the corresponding addresses in the memory 7 in units of pixels. At the same time, data of all effective pixels of the scanning lines 115 and 116 are integrated by the integrator 10.

FIG. 9(d) shows an analog integration value. The integration value is increased with a lapse of time. When the integration value is larger than the contents (FIG. 9(c)) of the register 11, an output from the comparator 12 is inverted as shown in FIG. 9(e). The SSG 13 is switched from a high speed read-out mode for integration to a normal read-out mode. A read-out operation is started on the screen in the same order as in the clearing operation, as shown in FIG. 9(b).

Since data corresponding to the quantities of light read out previously during the exposure time interval (integration time) are present for the scanning lines 115 and 116, the current data of the scanning lines 115 and 116 are added to the already present data at the addresses corresponding to the pixels of the scanning lines 115 and 116, and the resultant sums are stored at the same addresses.

FIGS. 10(a) to 10(e) are timing charts obtained by improving the sequence of FIGS. 9(a) to 9(e). In the timing charts shown in FIGS. 9(a) to 9(e), since clearing is started from the scanning lines 101 and 102, a time lag, i.e., an exposure time error, occurs from the start of exposure of the upper scanning lines of the image pickup element 3 to the start of actual exposure (integration) of the scanning lines 115 and 116 including the integration pixels. This problem typically occurs only when the luminance of the object is extremely high (when the object luminance is not so high, this error is negligible). Although the error can be easily corrected in accordance with information such as an object luminance measured during the ON period of the switch SW1, the error is eliminated from the beginning, as shown in FIGS. 10(a) to 10(e). The above problem does not occur when a sensor capable of simultaneously clearing all pixels and reading out data in units of pixels or scanning lines is used.

As is apparent from the timing charts shown in FIGS. 10(a) to 10(e), clearing and a normal detection operation of the scanning lines 115 and 116 including the integration pixels are started, as shown in FIGS. 10(a) and 10(b). For this reason, integration (photometry) can be performed from the beginning, and the above error can be eliminated from the beginning. FIG. 10(c) shows the contents of the register 11, FIG. 10(d) shows the integration value, and FIG. 10(e) shows the change in mode. In this operation, the read-out operation can be apparently performed at high speed as in FIGS. 9(a) to 9(e).

The memory 7 for storing at least one-field or one-frame image data is arranged, and part of all the image data of the image pickup element 3 is repeatedly read out during the exposure time interval. Of the previously read-out image data, the data corresponding in positions to the current image data are added thereto, and the sums are stored at the same addresses. The values of the image data are integrated to perform photometry. Data corresponding to light intensities of some or all the pixels of the image pickup element 3 are read out during the exposure time interval and are added to the values in the memory 7 at the same addresses as those of the current image data. The sums are then stored at the same addresses. This operation is repeated, and at the same time, the values of the data of the read-out pixels are integrated to measure the quantity of light incident on the image pickup element 3 in a real time manner. An appropriate exposure time is obtained by utilizing this value (integration value). For this reason, this scheme can cope with changes in object luminances upon the start of exposure, and an appropriate object image can always be obtained. In addition, a photometry sensor need not be arranged to simplify the overall arrangement to achieve low cost and compactness.

Figure 11:
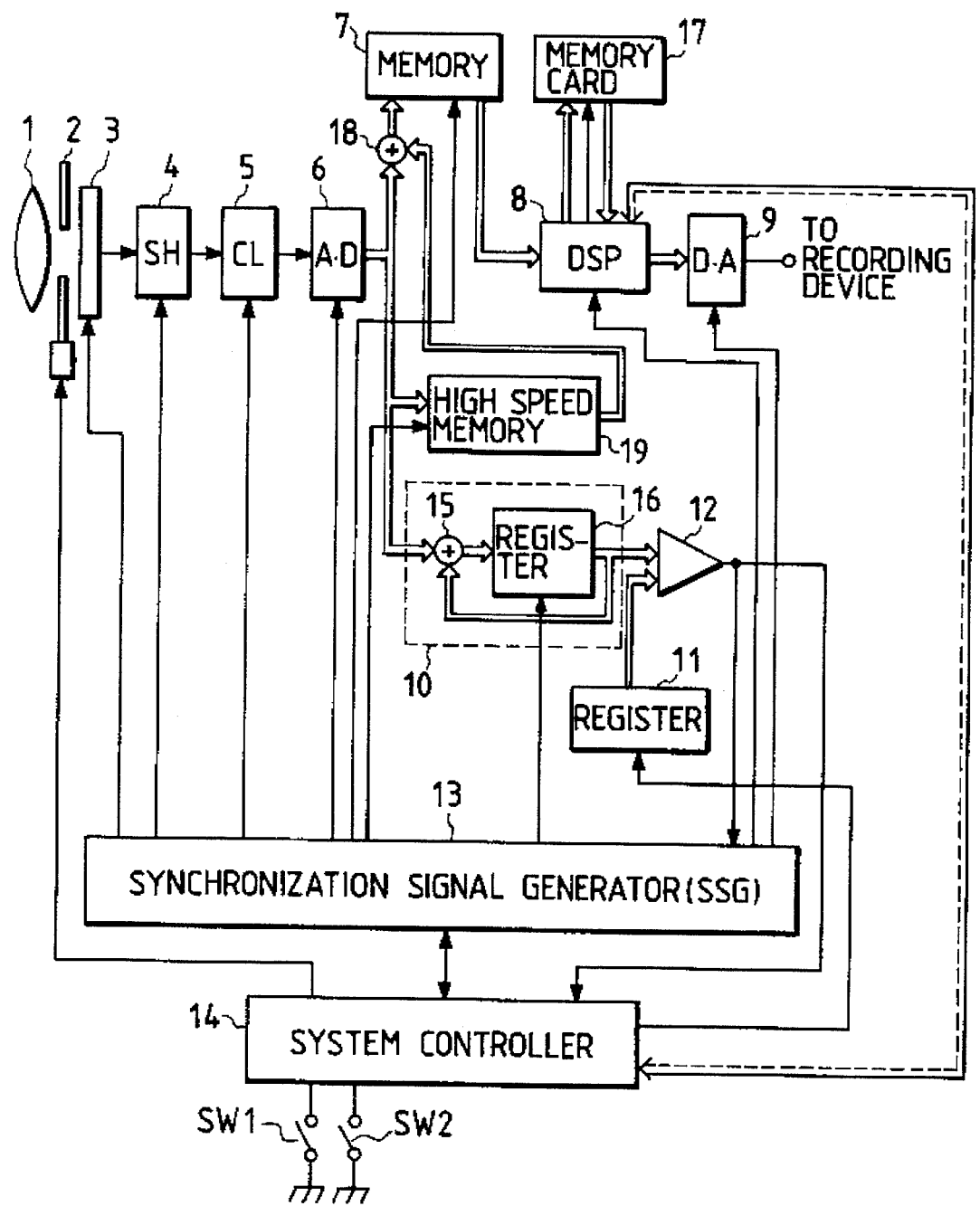
FIG. 11 is a block diagram showing an arrangement of the second embodiment of the present invention.

FIG. 11 is a block diagram showing the second embodiment of the present invention. The same reference numerals as in FIG. 2 denote the same parts in FIG. 11. In the second embodiment, a high speed memory 19 for storing the same pixel data as the reference pixel data in units of pixels is arranged independently of a memory 7 serving as a read-out buffer memory used upon completion of exposure. At the time of read access of an image signal from an image pickup element 3 and write access of the image signal in the memory 7 upon completion of exposure, corresponding pixel data are added by an adder 18 and at the same time transferred to the memory 7. That is, the high speed memory 19 has a capacity corresponding to 60 pixels of the two scanning lines in FIG. 7. One input terminal (i.e., the terminal connected to the output of the memory 7 in the arrangement of FIG. 2) of the adder 18 arranged between an A-D converter 6 and the memory 7 is connected to the output terminal of the high speed memory 19.

An operation of the above arrangement will be described below. In a read-out operation upon completion of exposure in the arrangement of FIG. 2, instead of an operation for adding the data stored in the memory 7 to the data read out from the image pickup element 3 and storing the sums in the memory 7, data stored in the high speed memory 19 are added to the data read out from the image pickup element 3, and the sums are stored in the memory 7. The second embodiment has the same effect as that in the embodiment shown in FIG. 2.

Figure 12:
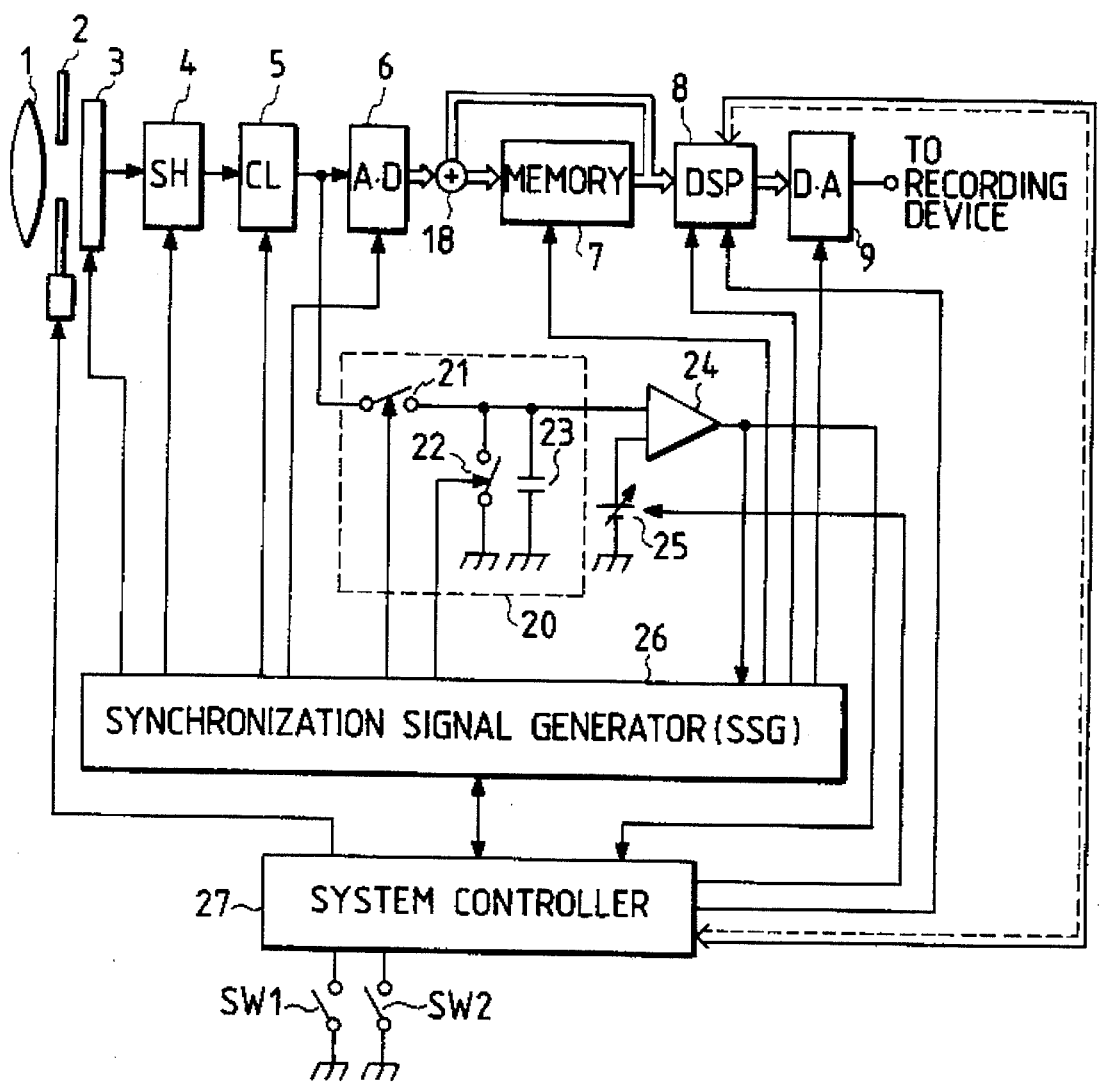
FIG. 12 is a block diagram showing an arrangement of the third embodiment of the present invention.

FIG. 12 shows the third embodiment of the present invention. An analog integrator 20 comprises a switch 21 which is turned on/off to perform/interrupt an integration operation, a switch 22 for resetting the integrator 20, and an integration capacitor 23. The analog integrator 20 constitutes the same measuring means as in the integrator 10 in FIG. 2. An image pickup apparatus of this embodiment also includes a comparator 24 serving as an analog comparator, a variable reference voltage source 25 whose output voltage is changed under the control of a system controller 27, and an SSG 26 for outputting timing signals such as synchronization clock pulses for operation control and operating pulses to an image pickup element 3, an SH circuit 4, a clamp circuit 5, an A-D converter 6, a memory 7, a DSP 8, a D-A converter 9, and the integrator 20 under the control of the system controller 27. The system controller 27 controls an iris 2, the SSG 26, the reference voltage source 25, and the DSP 8 to perform overall control of the image pickup apparatus. The system controller 27 constitutes the same processing means as in the system controller 14 in FIG. 2.

In the image pickup apparatus having the above arrangement, a photometric operation performed during the ON period of a switch SW1 is the same as that of the embodiment shown in FIG. 2, and a detailed description thereof will be omitted. A processing operation performed after the system controller 27 determines a combination of the iris and integration time for an appropriate exposure value in the image pickup mode and determines the ON period of a switch SW2 will be described below.

As in the embodiment shown in FIG. 2, exposure is started from clearing of the image pickup element 3. When this exposure is started, an image signal of scanning lines of scanning lines 141 and 142 (FIG. 7) of the image pickup element 3 is repeatedly read out in accordance with a signal from the SSG 26 at high speed. The read-out signal is sampled and held by the SH circuit 4 and is clamped by the clamp circuit 5. Only an effective component (except for a component in a blanking period) of the signal is supplied to the capacitor 23 through the switch 21. At the same time, the effective component is converted into digital data by the A-D converter 6. The digital data is added to the data already stored at the corresponding address in the memory 7 through an adder 18, and the sum is stored at the same address. Processing from the read access of the signal of the specific scanning lines of the image pickup element 3 to write access of the image signal in the memory 7 is repeated at a maximum speed, and potentials of the charges stored in the capacitor 23 are compared by the comparator 24. At this time, when the potential of the capacitor 23 exceeds an output value of the reference voltage source 25, the output from the comparator 24 is inverted. The inverted output is supplied to the SSG 26, so that the SSG 26 interrupts the read-out operation of the exposure amount integration signal (part) from the image pickup element 3. A read-out operation of the entire screen is immediately started to receive the image data.

In a read-out operation of the image data from the image pickup element 3, since the integrator 20, the comparator 24, and the reference voltage source 25 need not be used, the switches 21 and 22 are kept OFF and ON, respectively, thereby interrupting the operations of the above circuits. The image signal is read out from the image pickup element 3, and the corresponding pixel data is read out from the memory 7. These read-out data are added by the adder 18, and the sum is stored at the corresponding address portion of the memory 7. At this time, since data except for the integration pixels (i.e., the pixels of the scanning lines 115 and 116 in this embodiment) are set at "0"s, it is possible to omit the read-out operation of the memory 7 and the addition in the adder 18.

The image data stored in the memory 7 in this manner are read out from the memory 7 again and are subjected to predetermined signal processing (e.g., γ-correction, knee characteristic adjustment, white balance adjustment, generation of color difference signals, generation of a composite signal, addition of sync signals, and addition of a color burst). The processed data is converted into an analog signal by the D-A converter 9, and the analog signal is output to a transmission line of a monitor (EVF), an SV recorder, or another recording device.

With this arrangement, as in the embodiments shown in FIGS. 2 and 11, an exposure amount during the exposure time interval can be measured. A simple arrangement can cope with changes in object luminances upon the start of exposure. The same effect as in the first and second embodiments can be obtained in the third embodiment.

The respective embodiments of the present invention have been described independently of each other. It is possible to combine the second embodiment shown in FIG. 11 with the third embodiment shown in FIG. 12. The following arrangements (1) to (6) as developed forms of the respective embodiments can also be obtained.

(1) In the first embodiment shown in FIG. 2, the integrator 10, the adder 18, the register 11, and the digital comparator 12 are arranged independently of each other. However, since these circuits are digital processing circuits, they may be arranged integrally with the DSP 8 or on a single chip, thereby further reducing the cost.

(2) The memory 7 or 19 need not be a perfect random access memory, but can be a FIFO memory in which write and read start addresses can be set. In this case, the capacity of the memory can be reduced.

(3) Since the read-out rate of the existing image pickup element and the processing speed of the existing signal processing system are low, it is difficult to widen the integration area for photometry. In order to minimize this drawback, it is effective to employ a means for setting an integration area every predetermined number of lines in place of the integration area constituted by the adjacent scanning lines shown in FIG. 7.

(4) As a matter of course, if an image pickup element capable of selecting read-out pixels in units of pixels can be realized, the integration area for photometry can be dispersed in units of pixels.

(5) According to the present invention, although a so-called electronic shutter for starting exposure upon clearing of the image pickup element is used, a mechanical shutter may be used in place of the electronic shutter. However, if a mechanical shutter is employed, an operation delay may occur. In this case, a better result can be obtained when the value corresponding to a level for detecting the end of exposure is set smaller than the integration value.

(6) The normal order of reading out signals from the image pickup element is a downward order, i.e., an order from the top (top edge) to the bottom (tail edge). However, in consideration of integration for photometry, when a read-operation of scanning lines is started from the bottom (tail edge) to expose the scanning lines of the bottom portion (tail edge) earlier than those of the top portion (top edge), an integration start timing can be advanced and a shorter exposure time (earlier integration end time) can be obtained because the integration area for photometry is often set in a portion below the center (i.e., in order to prevent an adverse influence because the top edge is brighter than the average level). The reverse read-out order is compatible with write access to the memory 7, read access from the memory 7, internal processing in the DSP 8, or the write access to the memory card 17 when the order is reversed again. Information representing the read-out direction may be stored as additional information together with a video signal in the memory.

In all of the embodiments described above, clearing of the memory 7, the memory card 17, and the memory 19 has not been described in detail. It is, however, apparent that clearing is performed immediately before exposure (i.e., the same timing as clearing of the image pickup element).

In each embodiment described above, a means for repeatedly reading out some or all of the image data from the image pickup means during the exposure time interval is arranged. The read-out data are integrated during the exposure time interval to measure an exposure amount. An exclusive photometry sensor need not be arranged, and a simple arrangement can achieve low cost and compactness. In addition, the simple arrangement can cope with changes in object luminances upon the start of exposure, and an appropriate object image can always be obtained.

FIG. 13 is a block diagram of an image pickup apparatus according to the fourth embodiment of the present invention. The same reference numerals as in the first embodiment shown in FIG. 2 denote the same parts in FIG. 13, and a detailed description thereof will be omitted.

In the embodiment shown in FIG. 13, an auxiliary light device 50 which is used for a dark object is arranged. The auxiliary light device 50 signals its own state to a system controller 14. The auxiliary light device 50 emits auxiliary light or stops emitting it in accordance with control by the system controller 14 and a signal from a comparator 12.

Figure 14B:
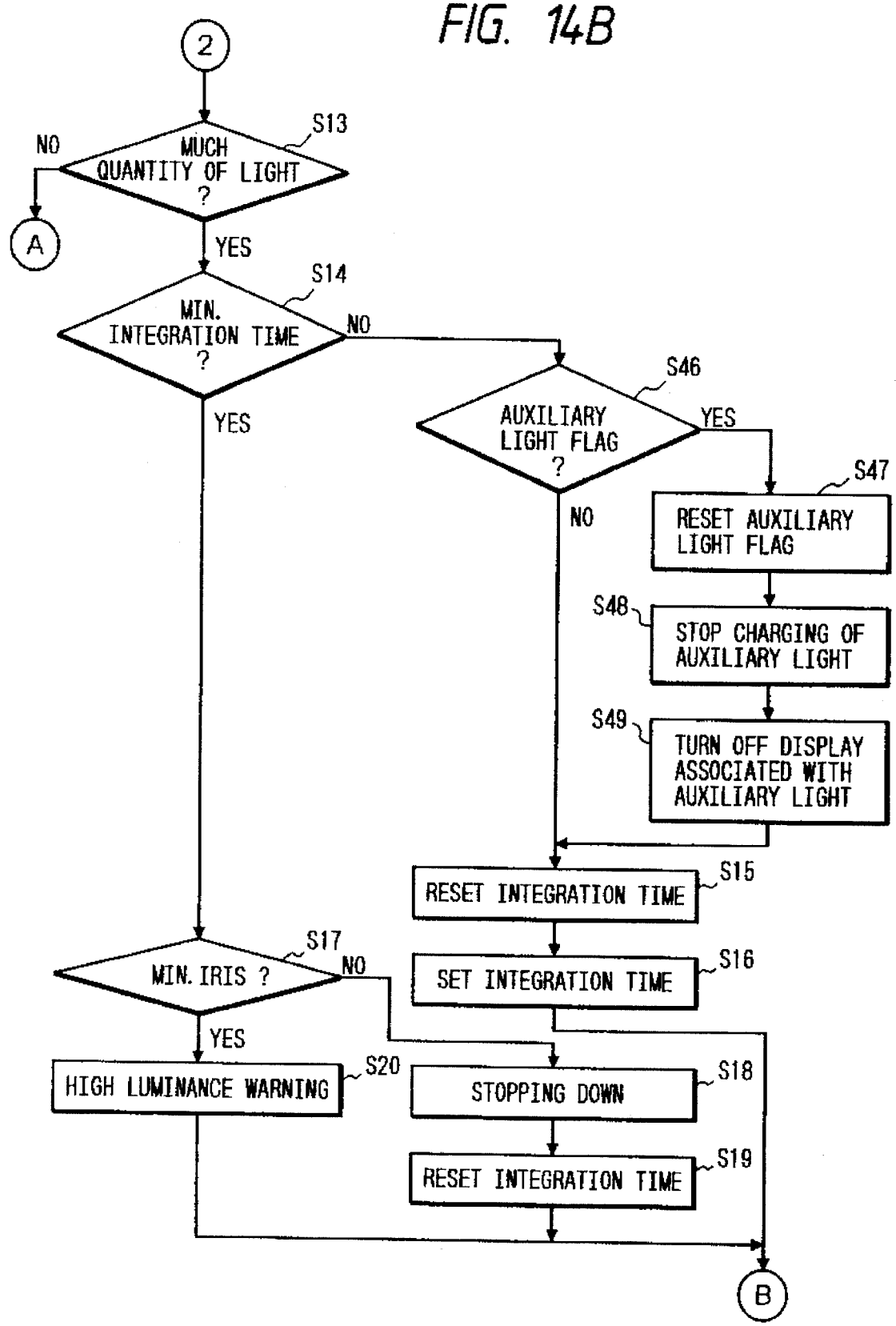
FIG. 14 is a flow chart showing a processing operation of the image pickup apparatus shown in FIG. 13.
Figure 15B:
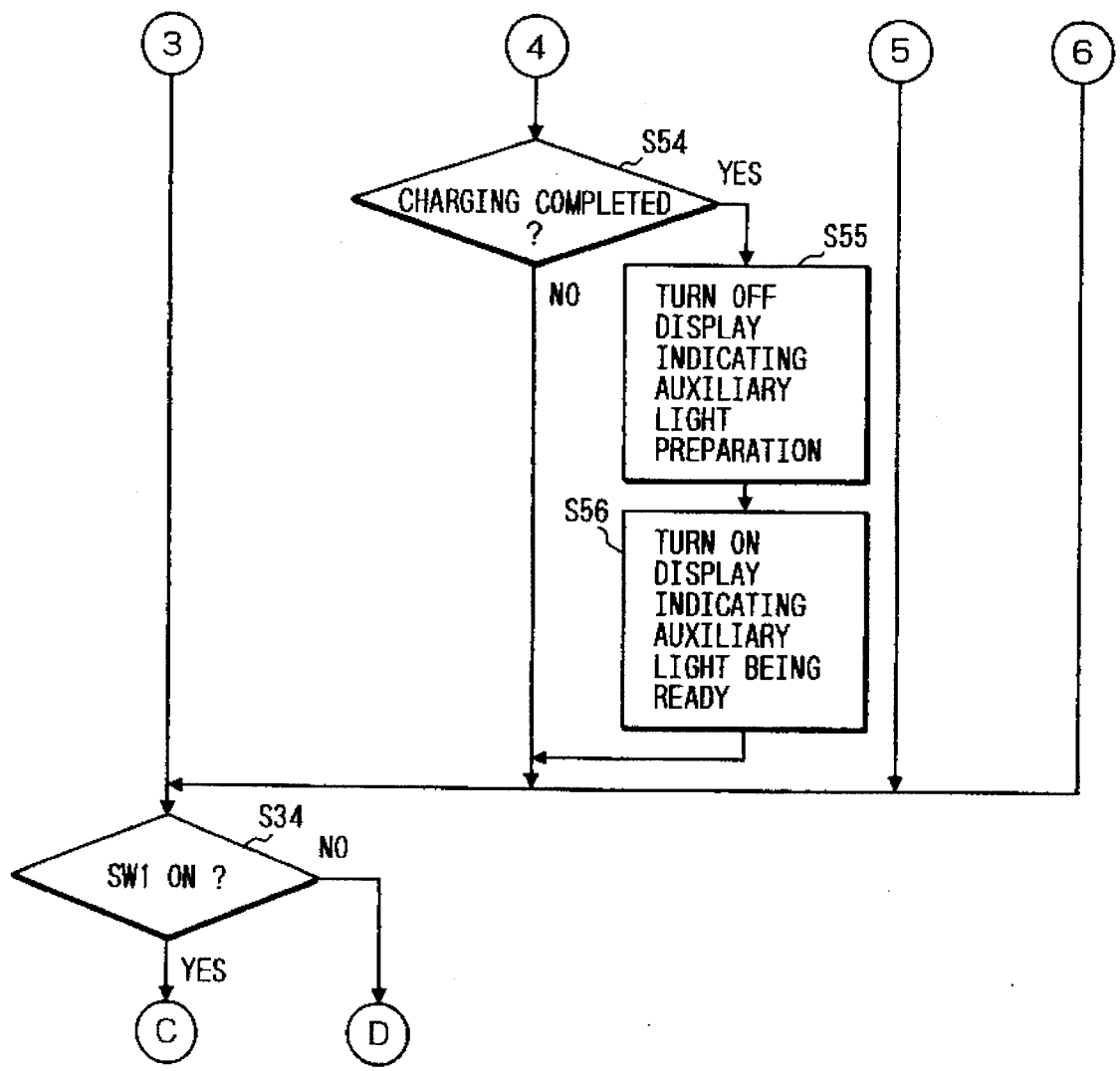
FIG. 15 is a flow chart showing another processing operation of the image pickup apparatus shown in FIG. 13.
Figure 16B:
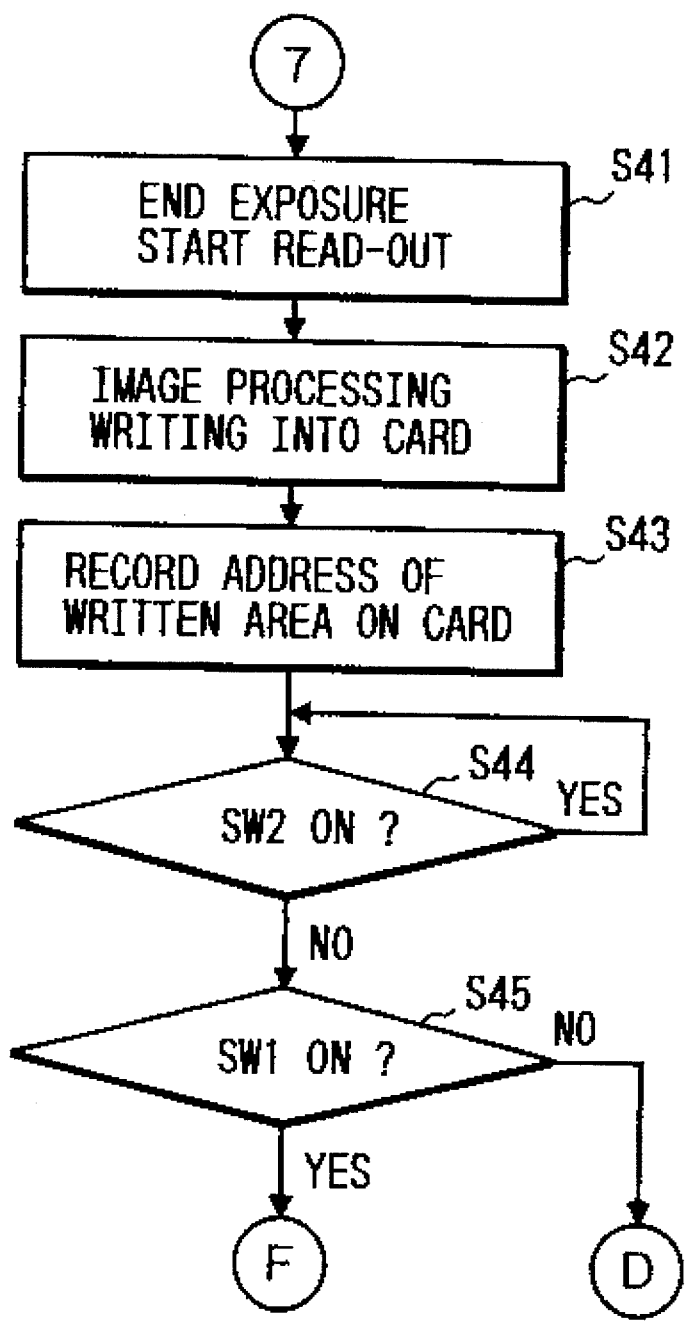
FIG. 16 is a flow chart showing still another processing operation of the image pickup apparatus shown in FIG. 13.

Operations of the image pickup apparatus having the above arrangement will be described with reference to flow charts in FIGS. 14 to 16. FIGS. 14 to 16 are flow charts of normal image pickup operations. Connectors A to F represent connection points between the flow charts. These flow chart operations are controlled by the system controller 14.

When a main switch (not shown) of the system is turned on, the system controller 14 is started to operate as in the initialization operations in FIG. 3. The internal states (registers and courters) of the system controller 14 are initialized (S1) upon the start of the system controller 14. The initialization operations include setting of an external interruption condition by a switch SW1 (S2).

After these operations are completed, the system controller 14 is set in a waiting mode (sleep mode) for waiting for an external interruption to reduce power consumption.

In this state, when the switch SW1 is turned on, a processing routine in an external interruption mode is started by hardware of the system controller 14. In this routine, an external interruption is inhibited (S3). The system controller 14 determines whether this interruption is generated by turning on the switch SW1 (S4).

If this interruption is not generated by the switch SW1 (i.e., the interruption may be generated by noise or the like), an external interruption condition is set again, and the sleep mode is set (S5).

However, when the switch SW1 is determined to be ON, a power is supplied to an SSG 13, a DSP 8, an SH circuit 4, a clamp circuit 5, and an A.D converter 6 to start oscillating the SSG 13 (S6).

A mode for causing the SSG 13 and the DSP 8 to perform a photometry operation is set (S7 and S8). A value of an iris 2 of the optical system and an integration time of an image pickup element 3 which is controlled by the SSG 13 are set (S9 and S10).

After these preparatory setting operations are completed, an unnecessary charge stored in the image pickup element 3 is cleared (removed) (S11). Image signal reading-out and integration are started (S12). At this time, the integration time is controlled by the SSG 13. When exposure is performed by the set time, the image signal is read out from the image pickup element 3 and is integrated (added) in the form of digital values by a necessary quantity in the DSP 8.

The system controller 14 receives the sum of the necessary quantity (i.e., an 8-bit average value obtained by dividing the sum of the 8-bit data obtained in units of pixels by the number of pixels) from the DSP 8 and determines on the basis of the reception data whether the exposure amount is appropriate (S13 and S21).

The system controller 14 determines whether the quantity of light is too much in accordance with whether the quantity of light has a value larger than a predetermined value (S13). The system controller 14 determines whether the quantity of light is too little in accordance with whether the quantity of light has a value smaller than a given value different from that in step S13 (S21).

If YES in step S13, the system controller 14 determines whether the integration time is a minimum integration time (S14). At this time, if NO in step S14, the system controller 14 determines whether auxiliary light is prepared (S46). If an auxiliary light flag is not set, the accumulated integration time is reset (S15), and a new integration time is set again (S16). In addition, the integrator in the DSP 8 is reset. However, if YES in step S14, the system controller 14 determines whether the iris is a minimum iris (S17). If NO in step S17, stopping down control is performed (S18), and the accumulated integration time is reset (S19). In this case, the integrator in the DSP 8 is reset. However, if YES in step S17, high luminance warming is performed (S20).

If the quantity of light is determined in step S13 to be too much, and the integration time for the immediately preceding measurement is determined in step S14 not to be set to a minimum integration time, the auxiliary light preparation state is checked by the auxiliary light flag (S46). If the auxiliary light preparation state is determined to be set (i.e., if the auxiliary light flag is set), the system controller 14 determines that the object luminance is temporarily determined as a luminance which requires the auxiliary light, and then the quantity of light becomes a much quantity of light because the object luminance is increased afterwards, the auxiliary light flag is reset (S47). Charging of the auxiliary light is stopped (S48) to turn off display associated with the auxiliary light (S49), thereby releasing the auxiliary light preparation state.

In steps S13 and S21, when the quantity of light is determined to be neither a much quantity of light nor too little, the quantity of light is regarded as an appropriate quantity of light. An object luminance is calculated in accordance with the corresponding iris value of the optical system, the corresponding integration time, and sensitivity data of the image pickup element 3 which is input in advance. A combination of an iris value and an integration time (exposure time in the image pickup mode) which are predetermined in correspondence with the calculated object luminance is stored for a future photographic operation (S28). If the quantity of light is determined in step S13 not to be too much light and is determined in step S21 to be too little, the system controller 14 determines whether the iris is open (S22). If NO in step S22, the system controller 14 opens the iris to increase the quantity of light (S23). The old integration time is converted to a value corresponding to a new iris value (S24).

When the iris is determined to be fully open and the iris cannot be further opened, the system controller 14 determines whether the integration time is a maximum integration time (S25) and sets again to increase the integration time (S26). When the iris is open and integration is performed by the time corresponding to the maximum integration time in the exposure mode, the image pickup apparatus is determined not to be able to perform an image pickup operation with only natural light, i.e., a low luminance state is determined, and it is determined whether the auxiliary light preparation state is set (S50).

If the auxiliary light flag is set, completion of charging of auxiliary light is checked (S54). If a less quantity of light is determined and the auxiliary light flag is determined not to be set in the decision step S50 though the iris is open and integration is performed by the time corresponding to the maximum integration time in the exposure mode, the auxiliary light flag is set (S51), charging of the auxiliary light is started (S52), and display indicating auxiliary light preparation is turned on (S53).

When completion of charging in checking completion of charging (S54) is determined, the display indicating auxiliary light preparation is turned off (S55), and at the same time, the display indicating the auxiliary light being ready is turned on (S56).

Adjustment of the iris and the integration time in the photometry loop (S11 to S34) in FIGS. 14 and 15 is not limited to the order of these steps. In this embodiment, in order to shorten the one-cycle time of the photometry loop, when the quantity of light is too much, the integration time is shortened and the iris is closed after the minimum integration time is set.

However, when the quantity of light is too little, the iris is fully opened and the integration time is prolonged after the fully open iris is obtained. The maximum integration time in the photometry mode must be shorter than the maximum integration time in the image pickup mode, as a matter of course. In this case, a decrease in sensitivity, which is caused by the shorter integration time in the photometry mode than the integration time in the image pickup mode, can be compensated by an increase in gain of a signal processing system, an increase (the sum is divided not by the number of pixels, but by a number smaller than the number of pixels) of a coefficient for obtaining an average value in the DSP 8, or the like.

In this case, since the operation does not aim at obtaining pixels, a decrease in S/N ratio does not pose any problem (since integration is performed, the S/N ratio can be increased as compared with an operation using one pixel). The old integration time is converted into a new iris value in step S24 due to the following reason. When the quantity of light is too little, the value of the quantity of light integrated within one cycle of the photometry loop is not wasted but added to the integration value in the next cycle. For this reason, when the object is bright, the integration time is measured every cycle of the photometry loop (for this purpose, the accumulated integration time is reset in steps S15 and S19). However, when the object is dark, the integration time is not reset every cycle but is accumulated.

Opening/closing of the iris and changes in integration time in the photometry cycle are preferably preformed to change the degree of opening/closing and the degree of changes in integration time in accordance with the integration value and the accumulated integration value in the previous photometry cycle (not by a comparison with single values).

For example, when the previous accumulated integration value is slightly smaller than a value corresponding to the appropriate level, the iris is opened by one step (1 EV) and at the same time the integration time is reduced to ½. When the previous accumulated integration value is much smaller (larger) than the value of the appropriate level, the iris can be fully opened (stopping down), and the integration time can also be prolonged (shortened).

As a result of processing of the photometry loop, when the iris value and the integration time (in other words, a luminance value of the object) which correspond to an appropriate quantity of light are determined, an iris and an integration time in the image pickup mode are calculated and stored (S28). Thereafter, the ON/OFF state of a switch SW2 is checked (S29).

At this time, if the switch SW2 is ON, image pickup processing from step S35 in FIG. 16 is started. However, if the switch SW2 is OFF, an integration time for setting appropriate exposure for the fully open iris is calculated (S30), and then the iris is fully opened (S31).

Thereafter, the integration time is set again to be the integration time calculated in step S30 (S32). The accumulated integration time (a counter for measuring a total integration time in a plurality of cycles of the photometry loop when the object is dark) is reset (S33). The ON/OFF state of the switch SW1 is checked (S34). At this time, the integrator of the DSP 8 is also reset. In this case, if the switch SW1 is ON, the flow returns to the start of the photometry loop. However, when the switch SW1 is OFF, an interruption condition is set again to return to the sleep mode.

When the object is so bright that the calculation result in step S30 represents a time shorter than the minimum integration time in the fully open iris state, the iris is set to have an iris value for setting the integration time to be the minimum integration time, as a matter of course. The above loop is repeated while the switch SW1 is ON and the switch SW2 is OFF.

This processing (S30 to S33) is performed to fully open the iris to shorten the integration time after the combination of the iris and the exposure time which give an appropriate exposure amount is found. In other words, the above processing is performed to minimize the photometry time.

In the loop (S30 to S33), after a combination of an iris and an integration time which can provide appropriate exposure in the image pickup mode is obtained, when the switch SW2 is detected to be ON (S29), the above image pickup processing is started. At this time, as shown in FIG. 16, the iris calculated in step S28 is set (S35), and the SSG 13 and the DSP 8 are set in the image pickup mode (S36 and S37). When these image pickup preparation operations are completed, the SSG 13 is controlled to remove (clear) the unnecessary charge from the image pickup element 3 to start exposure for picking up the object image (S38).

It is then checked whether a mode using the auxiliary light is set (S57 and S58). If the auxiliary light flag is set and charging is completed, the auxiliary light is emitted (S59), and the system controller 14 then determines whether the integration value reaches the appropriate exposure amount (S39). In a state except for this state, the auxiliary light is not emitted, and the exposure is started (S38). Thereafter, part of the image signal is read from the image pickup element 3 and is then integrated. The integration value is compared with the appropriate exposure value set in a register 11 in advance. The system controller 14 determines whether the integration value reaches the appropriate exposure amount (S39).

If YES in step S39 or when the integration time reaches the maximum integration time in the image pickup mode (S40), the SSG 13 outputs an exposure end signal to designate the start of reading-out of a memory 7 (S41). During this period, reading-out of part of the pixel information from the image pickup element and writing of read-out pixel information at the corresponding addresses of the memory 7, and timing control of the integration of the quantity of light in an integrator 10 are controlled by the SSG 13. However, a detailed description of these control operations will be described later.

When writing of the image signal in the memory 7 is completed, the DSP 8 performs image processing such as filtering, edge emphasis, and compression while reading out the image data from the memory 7. At the same time, the DSP 8 writes the processed signal on a memory card 17 (S42). At this time, the processing for reading out the signal from the memory 7 may be performed such that the image signals may be read out from areas in which the signals have been written in the memory 7 before the read-out from the image pickup element 3 and writing of the read-out signals in the memory 7 are perfectly completed.

The addresses of written area of the memory card 17 may be recorded on the memory card 17 (S43), thereby completing the image pickup operation.

The address of the written area of the memory card 17 is recorded on the memory card 17 to prevent the old recorded data from being lost by overwriting another data in the written area. In addition to recording of the address of the written area, if a recording order of memory areas is fixed, the next write address may be recorded.

Contrary to the above case (the address of the written memory area is recorded), an address of a writable memory area may be recorded. Alternatively, an address representing a smaller one of the writable memory area and the written memory area may be recorded, and at the same time, a flag representing whether the address is a writable or written area may be recorded.

When the above image pickup processing is completed, the flow returns to the next image pickup preparation operation (photometry loop) when the switch SW2 is turned off (S44). In this case, when the switch SW1 is also OFF, an interruption waiting condition is set to set a sleep mode (S45). In this embodiment, an image pickup operation is performed frame by frame, and the next image pickup preparation operations are started when the switch SW2 is turned off. However, in an image pickup apparatus having a so-called continuous photographic mode, the image pickup mode may be repeated while the switch SW2 is kept on.

Detection of a period from the start to the end of an image pickup operation and timing control until the start of reading out the image signal will be described in detail with reference to FIGS. 17 and 18.

Figure 17:
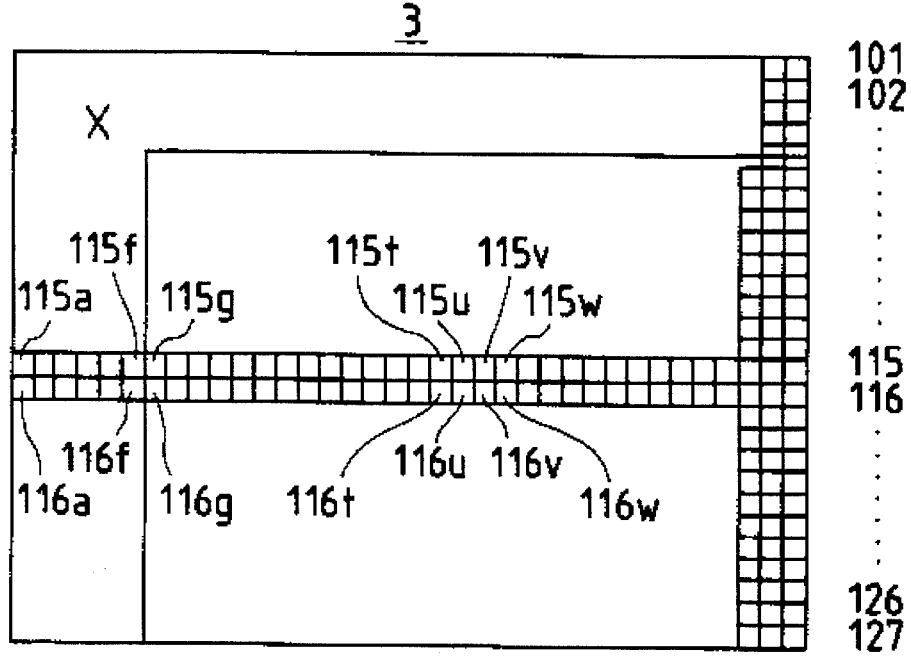
FIG. 17 is a view showing a pixel layout of an image pickup section of an image pickup element.

FIG. 17 illustrates an image pickup section (photoelectric conversion section) of the image pickup element 3. Small squares represented by reference numerals 116a, 116b, 116c . . . represent pixels, respectively. Scanning lines 101, 102, 103, . . . , 105, 106, . . . , 126, and 127 are constituted by the pixels. An area X is an optical black area obtained by shielding the pixels to give a black level reference to the image pickup element 3. In this embodiment, the number of horizontal effective pixels is 30, and the number of vertical effective pixels is 22.5. The necessary number of pixels varies depending on different television schemes.

Figure 18:
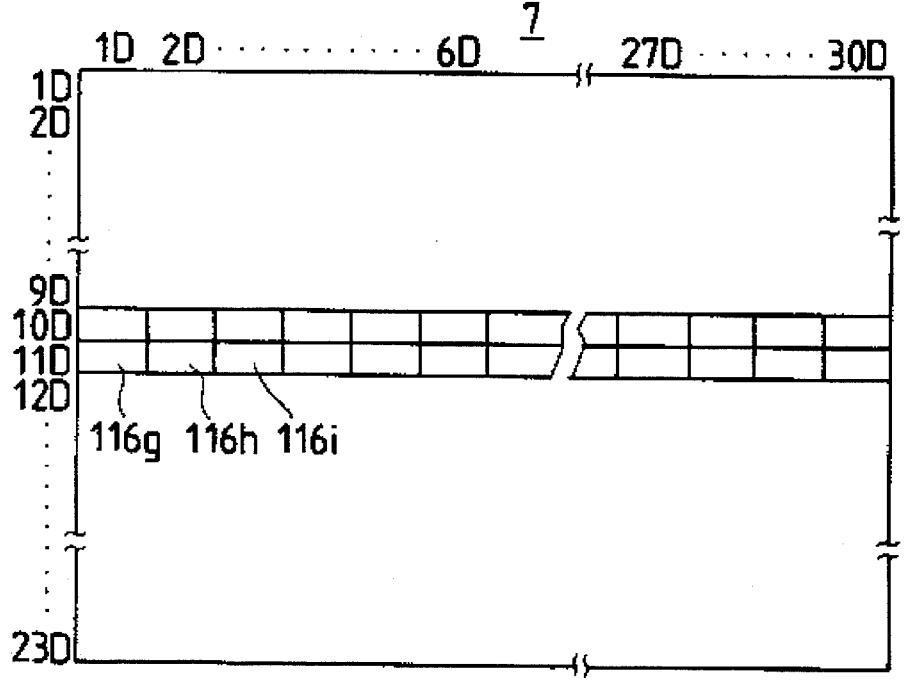
FIG. 18 is a view showing address allocation inside a memory.
Figure 19:
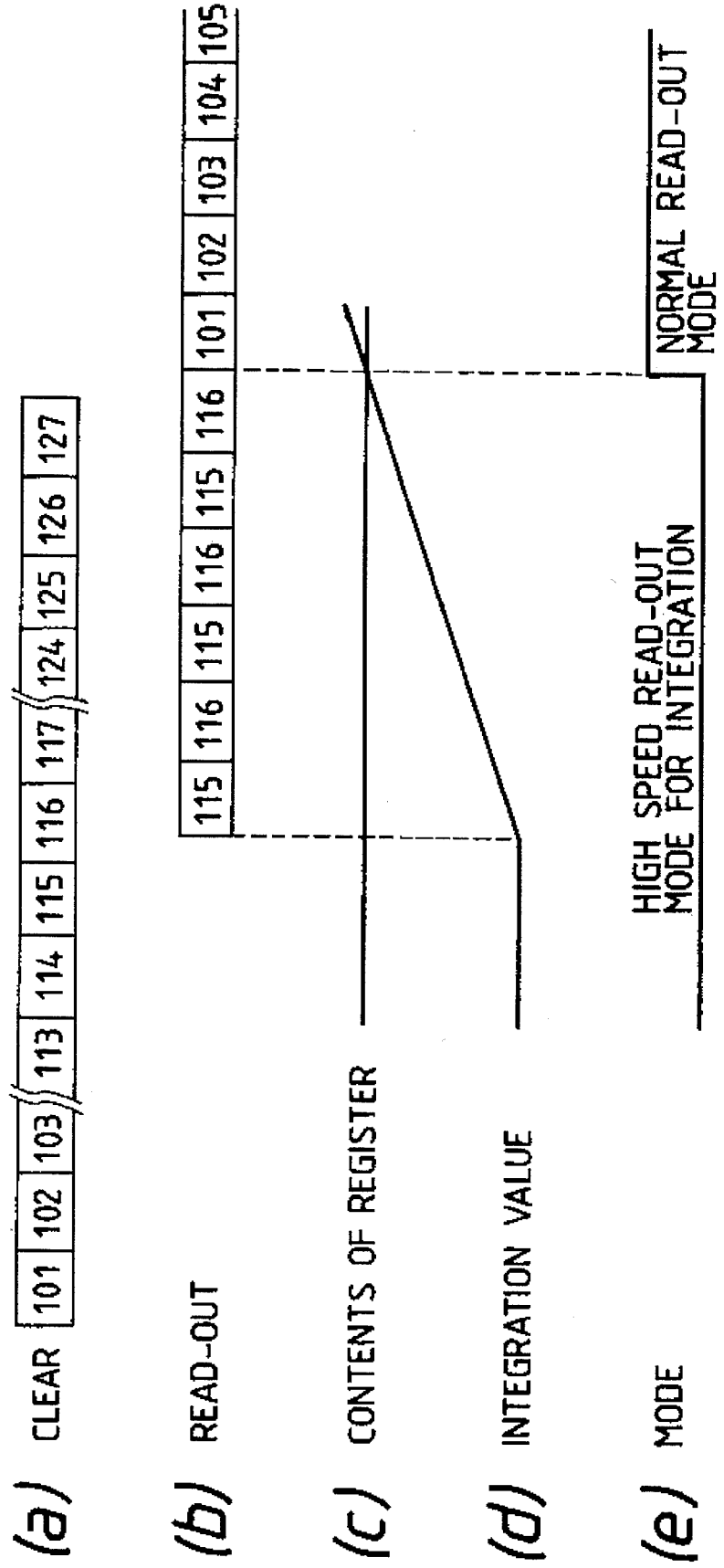
FIGS. 19(a) to 19(e) are timing charts showing an operation when a MOS sensor is used as the image pickup element.
Figure 20:
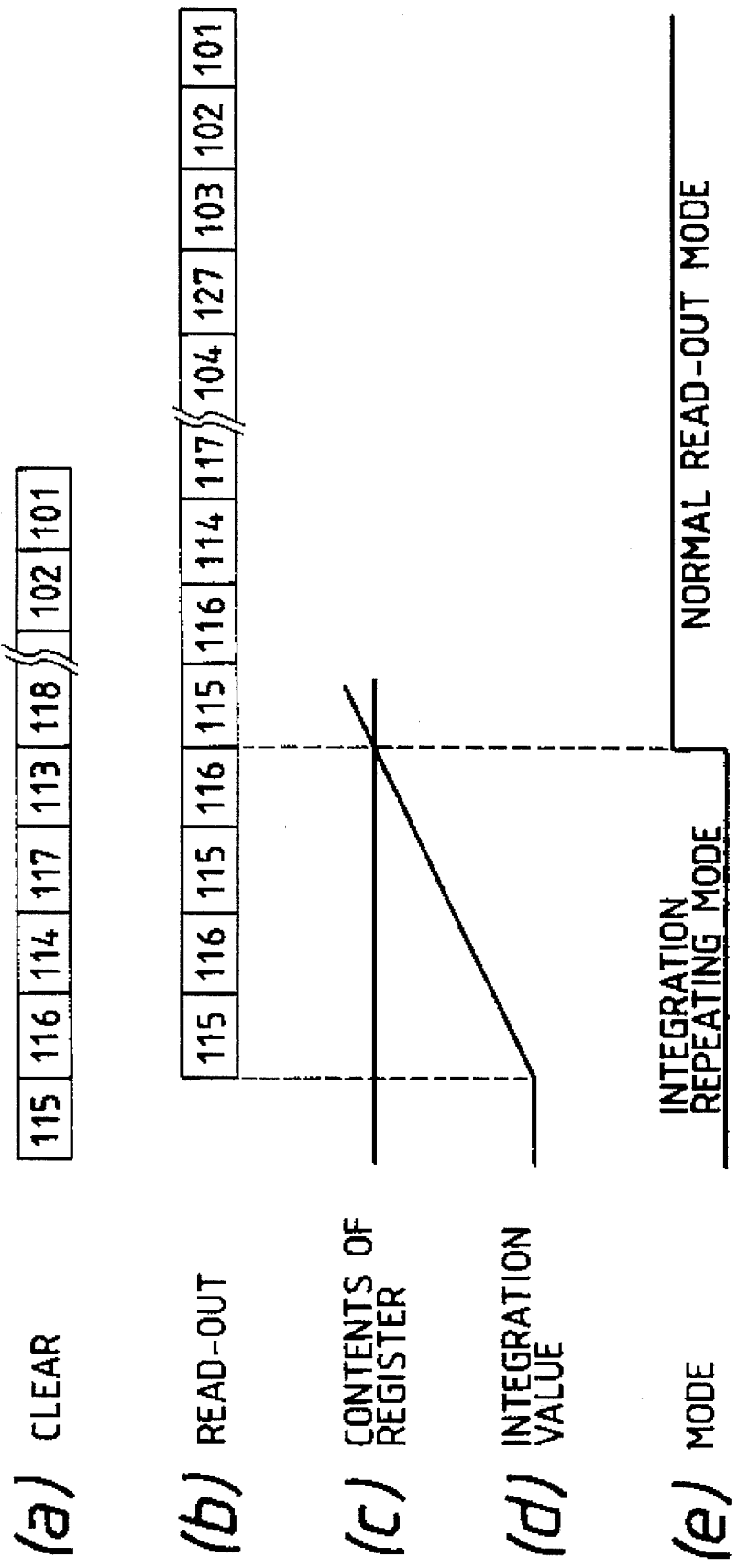
FIGS. 20(a) to 20(e) are timing charts showing an operation when the operation shown in FIG. 19(a) to 19(e) is improved.

FIG. 18 illustrates address allocation include the memory 7. The size of the memory 7 is determined to store the data of the effective pixels of the image pickup element 3 of FIG. 17. As shown in FIG. 18, a portion represented by a vertical address 11D and a horizontal address 1D is allocated in advance to store data (i.e., a digital value corresponding to brightness) of the pixel 116g in FIG. 17.

Similarly, the pixel 116h in FIG. 17 is allocated at the vertical address 11D and a horizontal address 2D, and the pixel 116i is allocated at the vertical address 11D and a horizontal address 3D. In this embodiment, the horizontal and vertical addresses can be independently set. In this case, one-dimensional addressing or three-dimensional addressing may be employed if random access is possible.

The exposure operation in the image pickup apparatus (FIG. 13) having the image pickup element 3 shown in FIG. 17, the memory 7 shown in FIG. 18, and the SSG 13 corresponding to the image pickup element 3 and the memory 7 will be described first.

The exposure is started with the removal of an unnecessary charge stored in the image pickup element 3. More specifically, if the image pickup element 3 is a MOS sensor, pixels are reset. If the image pickup element 3 is a CCD, sweeping of a charge to an OFD is started. This operation is performed when necessary clock pulses are supplied from the SSG 13 to the image pickup element 3. When clearing (removal of the charge) of the image pickup element 3 ends, the SSG 13 outputs timing signals to the image pickup element 3, a subsequent signal processing system, and the memory 7. The SSG 13 repeatedly reads out image signals from the pixels constituting the scanning lines 115 and 116.

Unnecessary reset pulses and the like are removed by the SH circuit 4 from the image pickup signal read out from the image pickup element 3. The optical black portions (115a to 115f and 116a to 116f) are clamped by the clamp circuit 5. The resultant image signal is converted into a digital signal by the A-D converter 6. This digital signal is supplied to the integrator 10 and the memory 7. At this time, the image signal free from the optical black portions is added to the value stored at a given address (FIG. 17) by the adder 18, and the sum is stored again at the given address.

A register 16 in the integrator 10 does not receive the data while the optical black portions are kept input, so that only the effective pixels can be integrated. Therefore, pixel data of 60 pixels can be added by one read-out cycle in the integrator 10.

Light incident on the image pickup element 3 is integrated by the above processing (integration of pixel data of 60 pixels). A comparator 12 determines whether the resultant integration value becomes an appropriate level for the pixels of the image pickup element 3 and the dynamic range of the signal processing system. The value of the register 11 which is compared by the comparator 12 is set to be a value which is 60 times (i.e., a multiple corresponding to the number of pixels to be integrated) the appropriate level per pixel.

This value may be varied in accordance with the photometry information prior to the start of the image pickup operation (e.g., the value may be changed in accordance with a deviation of the luminance in the integration area currently subjected to an image pickup operation from the average value of the luminances in the entire image pickup area).

Although it is easy to read out an image signal per scanning line in the MOS sensor, a special structure is required in the CCD (e.g., an FET sensor having a shift gate to a vertical transfer path in units of pixels). To the contrary, in the MOS sensor, since the image signal can be read out in units of scanning lines, reading-out of each scanning line is easy. In the MOS sensor, however, the clear timing must be shifted every scanning line to prevent exposure irregularity in consideration of a read-out timing error in each scanning line upon clearing (start of exposure) of the image pickup element.

In addition, in this embodiment, although the output from the register 16 is input to the comparator 12, a gate may be arranged between the register 16 and the comparator 12 to initiate a comparison operation in the comparator 12 upon completion of one scanning/read-out cycle (in units of 60 pixels in this embodiment). The appropriate exposure value need not be set to be a multiple of the number of pixels subjected to integration in the register 11. The same effect can be obtained when a coefficient unit for dividing an output from the register 16 into a fraction of the number of pixels is arranged between the output of the register 16 and the comparator 12 (i.e., a position where a feedback circuit to an adder 15 is not adversely affected).

When the system controller 14 determines on the basis of the comparison result from the comparator 12 that an integration value of the quantity of light incident on reference pixels becomes an appropriate value, the integration operation (i.e., read-out and integration of the reference pixels) is stopped in response to a signal from the SSG 13, and a read-out operation is immediately started. This read-out operation is performed as in the normal read-out operation such that sampling, clamping, and A-D conversion are performed in units of scanning lines, and the digital data are stored in the memory 7 at addresses predetermined in units of pixels.

In particular, as for the reference pixels, the values are added to the values already stored at addresses subjected to write access, and the sums are stored at the same addresses (no problem occurs even if the values of all the pixels are added and the resultant sum is stored).

The image signal having an appropriate exposure amount has been stored in the memory 7 by the above operations. At this time, the reference pixels are limited to part of the entire image pickup area due to the following reason. When the above arrangement is to be obtained by using an existing image pickup element and an existing signal processing system, the read rate and the signal processing speed are limited. If the read rate of an image pickup element or the like is sufficiently high, reference pixels may be the pixels of the entire image pickup area.

In this case, data input to the integrator 10 are weighted depending on pixel addresses, and the photometry sensitivity distribution can be changed. This will be described later as the fourth embodiment.

A clearing sequence of the image pickup element 3 using a MOS sensor and its read-out sequence will be described with reference to FIGS. 19(a) to 20(e).

FIG. 19(a) to 19(e) are timing charts for explaining an operation performed when a time required to clear one scanning line and perform a normal read-out operation is different from a time required to read out one scanning line so as to integrate the image signal. In this case, the data are read out from the scanning lines downward in FIG. 17.

As shown in FIG. 19(a), the scanning lines 101, 102, . . . , 127 are cleared. When the scanning line 115 to be integrated is cleared, a read-out operation of the scanning line 115 is immediately started, as shown in FIG. 19(b). When clearing of the scanning line 116 is completed, a read-out operation of the scanning line 116 is performed. Subsequently, read-out operations of the scanning lines 115 and 116 are continuously performed.

The read-out image data are accumulated at the corresponding addresses in the memory 7 in units of pixels. At the same time, data of all effective pixels of the scanning lines 115 and 116 are integrated by the integrator 10.

FIG. 19(d) shows an analog integration value. The integration value is increased with a lapse of time. When the integration value is larger than the contents (FIG. 19(c)) of the register 11, an output from the comparator 12 is inverted as shown in FIG. 19(e). The SSG 13 is switched from a high speed read-out mode for integration to a normal read-out mode. A read-out operation is started on the screen in the same order as in the clearing operation, as shown in FIG. 19(b).

Since data corresponding to the quantities of light read out previously during the exposure time interval (integration time) are present for the scanning lines 115 and 116, the current data of the scanning lines 115 and 116 are added to the already present data at the addresses corresponding to the pixels of the scanning lines 115 and 116, and the resultant sums are stored at the same addresses.

FIGS. 20(a) to 20(e) are timing charts obtained by improving the sequence of FIGS. 19(a) to 19(e). In the timing charts shown in FIGS. 19(a) to 19(e), since clearing is started from the scanning lines 101 and 102, a time lag, i.e., an exposure time error, occurs from the start of exposure of the upper scanning lines of the image pickup element 3 to the start of actual exposure (integration) of the scanning lines 115 and 116 including the integration pixels.

This problem typically occurs only when the luminance of the object is extremely high (when the object luminance is not so high, this error is negligible). Although the error can be easily corrected in accordance with information such as an object luminance measured during the ON period of the switch SW1, the error is eliminated from the beginning, as shown in FIGS. 20(a) to 20(e). The above problem does not occur when a sensor capable of simultaneously clearing all pixels and reading out data in units of pixels or scanning lines is used.

As is apparent from the timing charts shown in FIGS. 20(a) to 20(e), clearing and a normal detection operation of the scanning lines 115 and 116 including the integration pixels are started, as shown in FIGS. 20(a) and 20(b). For this reason, integration (photometry) can be performed from the beginning, and the above error can be eliminated from the beginning.

FIG. 20(c) shows the contents of the register 11, FIG. 20(d) shows the integration value, and FIG. 20(e) shows the change in mode. In this operation, the read-out operation can be apparently performed at high speed as in FIGS. 19(a) to 19(e).

When the same clearing and read-out order as shown in FIGS. 20(a) to 20(e) is used while the entire area is used to constitute reference pixels and to write image data in the memory 7 and some or all the image data are integrated a time difference between the start of exposure and the start of integration for photometry can be reduced, as a matter of course.

The memory 7 for storing at least one-field or one-frame image data is arranged, and part of all the image data of the image pickup element 3 is repeatedly read out during the exposure time interval. Of the previously read-out image data, the data corresponding in positions to the current image data are added thereto, and the sums are stored at the same addresses. The values of the image data are integrated to perform photometry.

Data corresponding to light intensities of some or all the pixels of the image pickup element 3 are read out during the exposure time interval and are added to the values in the memory 7 at the same addresses as those of the current image data. The sums are then stored at the same addresses.

This operation is repeated, and at the same time, the values of the data of the read-out pixels are integrated to measure the quantity of light incident on the image pickup element 3 in a real time manner. An appropriate exposure time is obtained by utilizing this value (integration value).

For this reason, this scheme can cope with changes in object luminances upon the start of exposure, and an appropriate object image can always be obtained. In addition, a photometry sensor need not be arranged to simplify the overall arrangement to achieve low cost and compactness.

Figure 21:
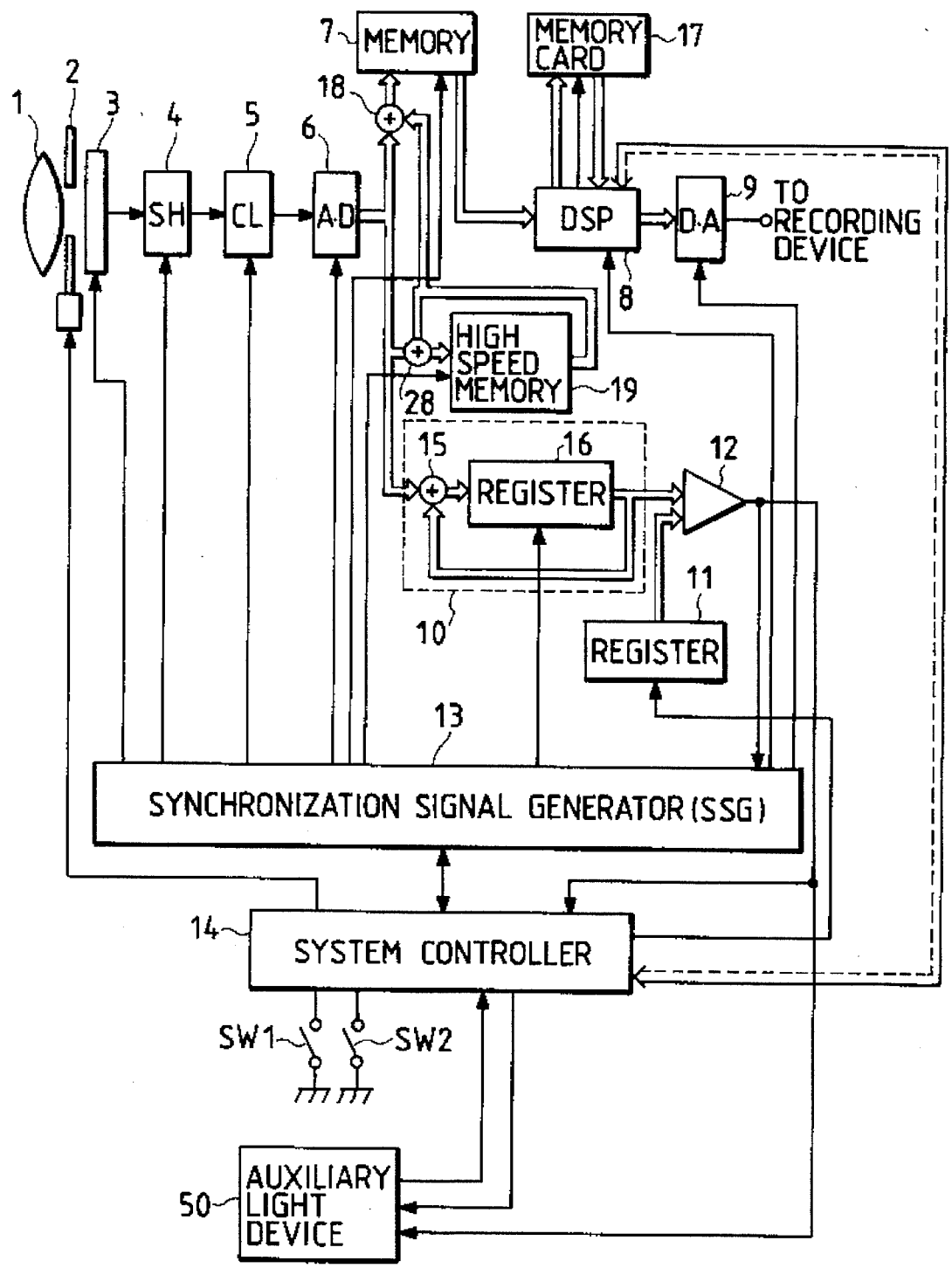
FIG. 21 is a block diagram showing an arrangement of the fifth embodiment of the present invention.

FIG. 21 is a block diagram showing the fifth embodiment of the present invention. The same reference numerals as in FIG. 13 denote the same parts in FIG. 11.

In the fifth embodiment, a high speed memory 19 for storing the same pixel data as the reference pixel data in units of pixels and a high speed adder 28 are arranged independently of a memory 7 serving as a read-out buffer memory used upon completion of exposure and the adder 18. The high speed memory 19 and the high speed adder 28 are used in a cumulative addition in units of pixels during a time interval for integrating an exposure amount. In a read-out operation of image signals from an image pickup element 3 and a writing operation of the image signals in the memory 7 upon exposure, corresponding pixel data from the image pickup element 3 and the high speed memory 19 are added by the adder 18, and the sums are transferred to the memory 7.

More specifically, the high speed memory 19 having a capacity corresponding to 60 pixels of the two scanning lines in FIG. 17 and the high speed adder 28 are arranged. During the integration time interval of the exposure amount which requires high speed data processing, these high speed systems (19 and 28) are used to accumulate the data in units of pixels at high speed. Upon completion of exposure, when pixel data is read out from the image pickup element 3 at normal speed, the corresponding pixels are read out from the high speed memory 19 and are added to the data from the image pickup element 3 by the adder 18.

An operation of the above arrangement will be described below. In a read-out operation upon completion of exposure in the arrangement of FIG. 13, instead of an operation for adding the data stored in the memory 7 to the data read out from the image pickup element 3 and storing the sums in the memory 7, data stored in the high speed memory 19 are added to the data read out from the image pickup element 3, and the sums are stored in the memory 7. The fifth embodiment has the same effect as that in the embodiment shown in FIG. 13.

The sixth embodiment according to the present invention will be described in detail with reference to FIG. 22.

Figure 22:
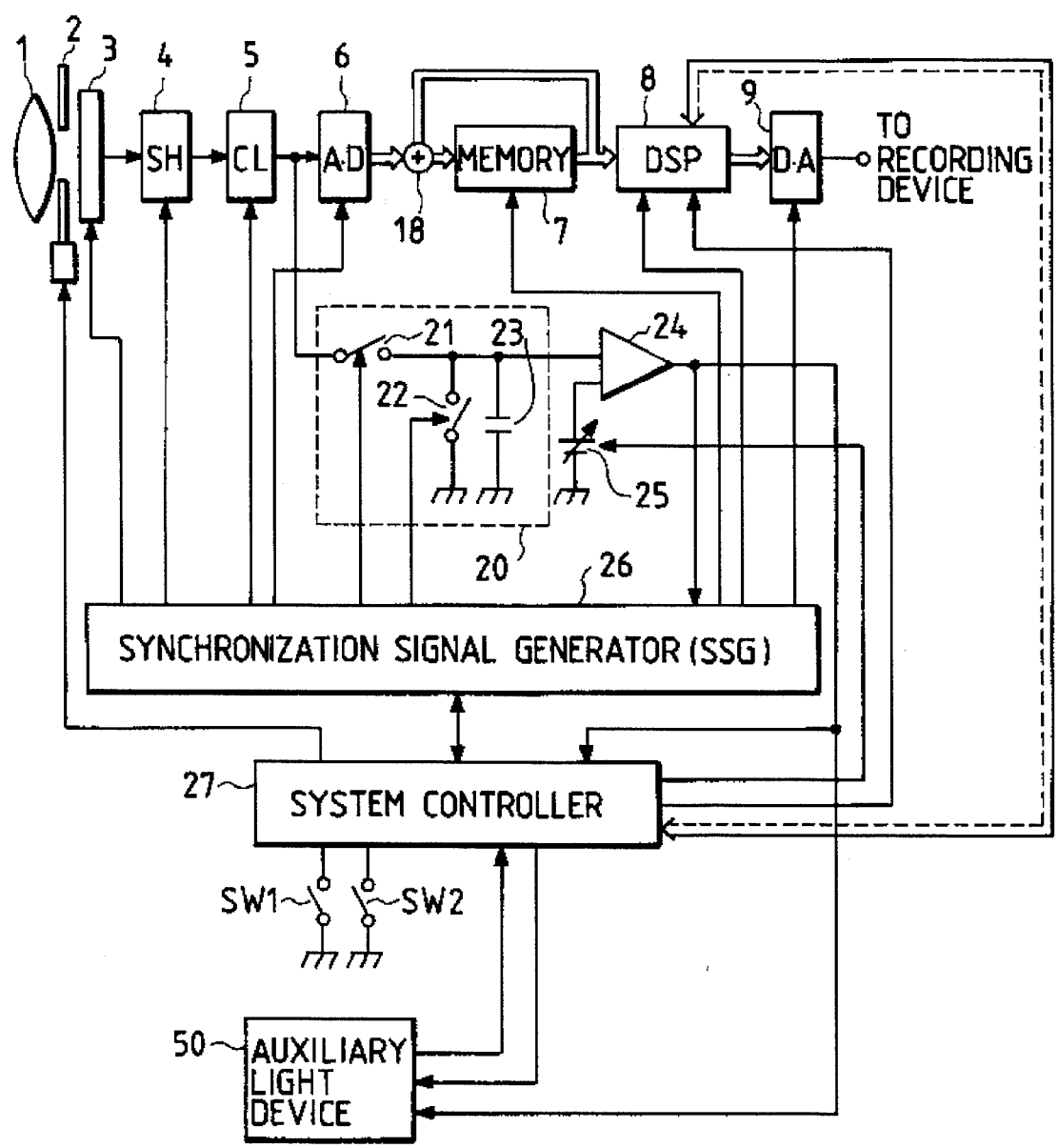
FIG. 22 is a block diagram showing an arrangement of the sixth embodiment of the present invention.

FIG. 22 shows the sixth embodiment of the present invention. An analog integrator 20 comprises a switch 21 which is turned on/off to perform/interrupt an integration operation, a switch 22 for resetting the integrator 20, and an integration capacitor 23. The analog integrator 20 constitutes the same measuring means as in the integrator 10 in FIG. 13.

An image pickup apparatus of this embodiment also includes a comparator 24 serving as an analog comparator, a variable reference voltage source 25 whose output voltage is changed under the control of a system controller 27, and an SSG 26 for outputting timing signals such as synchronization clock pulses for operation control and operating pulses to an image pickup element 3, an SH circuit 4, a clamp circuit 5, an A.D converter 6, a memory 7, a DSP 8, a D.A converter 9, and the integrator 20 under the control of the system controller 27. The system controller 27 controls an iris 2, the SSG 26, the reference voltage source 25, and the DSP 8 to perform overall control of the image pickup apparatus. The system controller 27 constitutes the same processing means as in the system controller 14 in FIG. 13.

In the image pickup apparatus having the above arrangement, a photometric operation performed during the ON period of a switch SW1 is the same as that of the embodiment shown in FIG. 13, and a detailed description thereof will be omitted. A processing operation performed after the system controller 27 determines a combination of the iris and integration time for an appropriate exposure value in the image pickup mode and determines the ON period of a switch SW2 will be described below.

As in the embodiment shown in FIG. 13, exposure is started from clearing of the image pickup element 3. When this exposure is started, an image signal of scanning lines of the scanning lines 115 and 116 of the image pickup element 3 is repeatedly read out in accordance with a signal from the SSG 26 at high speed. The read-out signal is sampled and held by the SH circuit 4 and is clamped by the clamp circuit 5. Only an effective component (except for a component in a blanking period) of the signal is supplied to the capacitor 23 through the switch 21. At the same time, the effective component is converted into digital data by the A.D converter 6. The digital data is added to the data already stored at the corresponding address in the memory 7 through the adder 18, and the sum is stored at the same address.

Processing from the read access of the signal of the specific scanning lines of the image pickup element 3 to write access of the image signal in the memory 7 is repeated at a maximum speed, and potentials of the charges stored in the capacitor 23 are compared by the comparator 24. At this time, when the potential of the capacitor 23 exceeds an output value of the reference voltage source 25, the output from the comparator 24 is inverted. The inverted output is supplied to the SSG 26, so that the SSG 26 interrupts the read-out operation of the exposure amount integration signal (part) from the image pickup element 3. An auxiliary light device 50 also receives this output to stop emitting the auxiliary light. The SSG 26 starts a read-out operation of the entire area for receiving image data.

In a read-out operation of the image data from the image pickup element 3, since the integrator 20, the comparator 24, and the reference voltage source 25 need not be used, the switches 21 and 22 are kept OFF and ON, respectively, thereby interrupting the operations of the above circuits. The image signal is read out from the image pickup element 3, and the corresponding pixel data is read out from the memory 7. These read-out data are added by the adder 18, and the sum is stored at the corresponding address portion of the memory 7. At this time, since data except for the integration pixels (i.e., the pixels of the scanning lines 115 and 116 in this embodiment) are set at "0"s, it is possible to omit the read-out operation of the memory 7 and the addition in the adder 18.

The image data stored in the memory 7 in this manner are read out from the memory 7 again and are subjected to predetermined signal processing (e.g., γ-correction, knee characteristic adjustment, white balance adjustment, generation of color difference signals, generation of a composite signal, addition of sync signals, and addition of a color burst). The processed data is converted into an analog signal by the D.A converter 9, and the analog signal is output to a transmission line of a monitor (EVF), an SV recorder, or another recording device. With this arrangement, as in the embodiments shown in FIGS. 13 and 21, an exposure amount during the exposure time interval can be measured. A simple arrangement can cope with changes in object luminances upon the start of exposure. The same effect as in the fourth and fifth embodiments can be obtained in the sixth embodiment.

Figure 23:
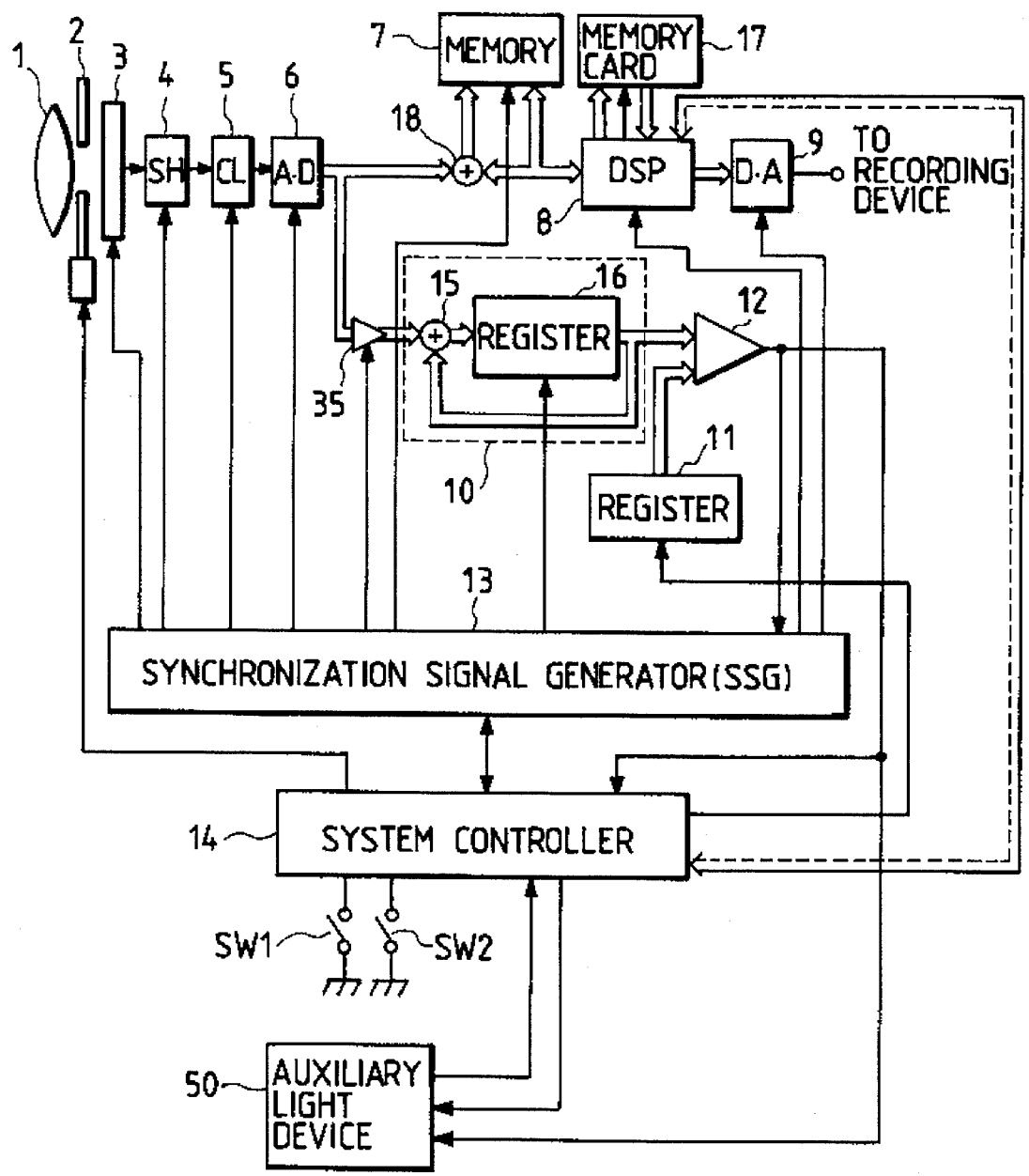
FIG. 23 is a block diagram showing an arrangement of the seventh embodiment of the present invention.

The seventh embodiment according to the present invention will be described with reference to FIG. 23. FIG. 23 is a block diagram showing the seventh embodiment of the present invention. The seventh embodiment is substantially the same as that of the fourth embodiment except that a variable coefficient unit 35 is inserted between an A.D converter 6 and an integrator 10. Operations except for those during repeated read-out for determining the exposure time are the same as those in the fourth embodiment. Only a description for operations during the repeated read-out time interval for determining the exposure time will be made.

As described with reference to the fourth embodiment, in the image pickup apparatus of the seventh embodiment, during the time interval for accumulating digital signals converted from image signals read out from an image pickup element 3 and storing the digital signals in a memory 7, coefficients corresponding to the pixel positions of the image pickup element are multiplied with the corresponding digital signals. The resultant signals are input to an adder 15 in the integrator and are integrated in the same manner as in the fourth embodiment.

The coefficients corresponding to the pixel positions of the image pickup element are determined as follows. Each of data corresponding to pixels 115$u$, 115$v$, 116$u$, and 116$v$ in FIG. 17 is multiplied with a weighting coefficient of 1, each of data corresponding to pixels 115$t$, 115$w$, 116$t$, and 116$w$ is multiplied with a weighting coefficient of 0.9, and data corresponding to each outer pixel is multiplied with a weighting coefficient of 0.8. In this manner, larger weighting coefficients are used toward the central pixels. In order to facilitate digital processing, coefficients may be 1, 0.5, 0.25, 0.125, . . . , $2^{-n}$ (where n is a positive integer or zero), or a sum of products of these two or three coefficients. Therefore, digital processing can be facilitated without using a general multiplier.

Figure 24:
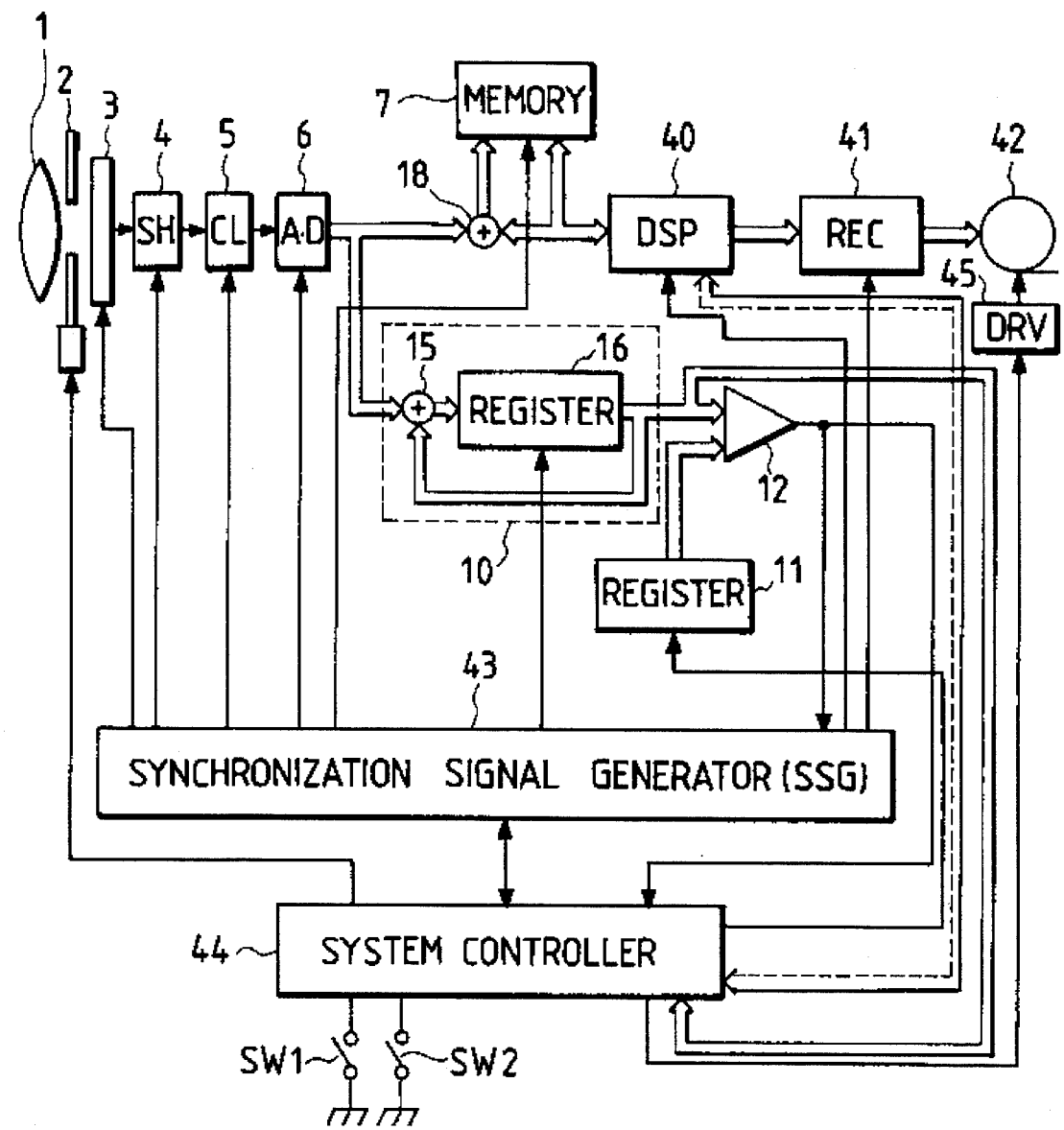
FIG. 24 is a block diagram showing an arrangement of the eighth embodiment of the present invention.
Figure 25B:
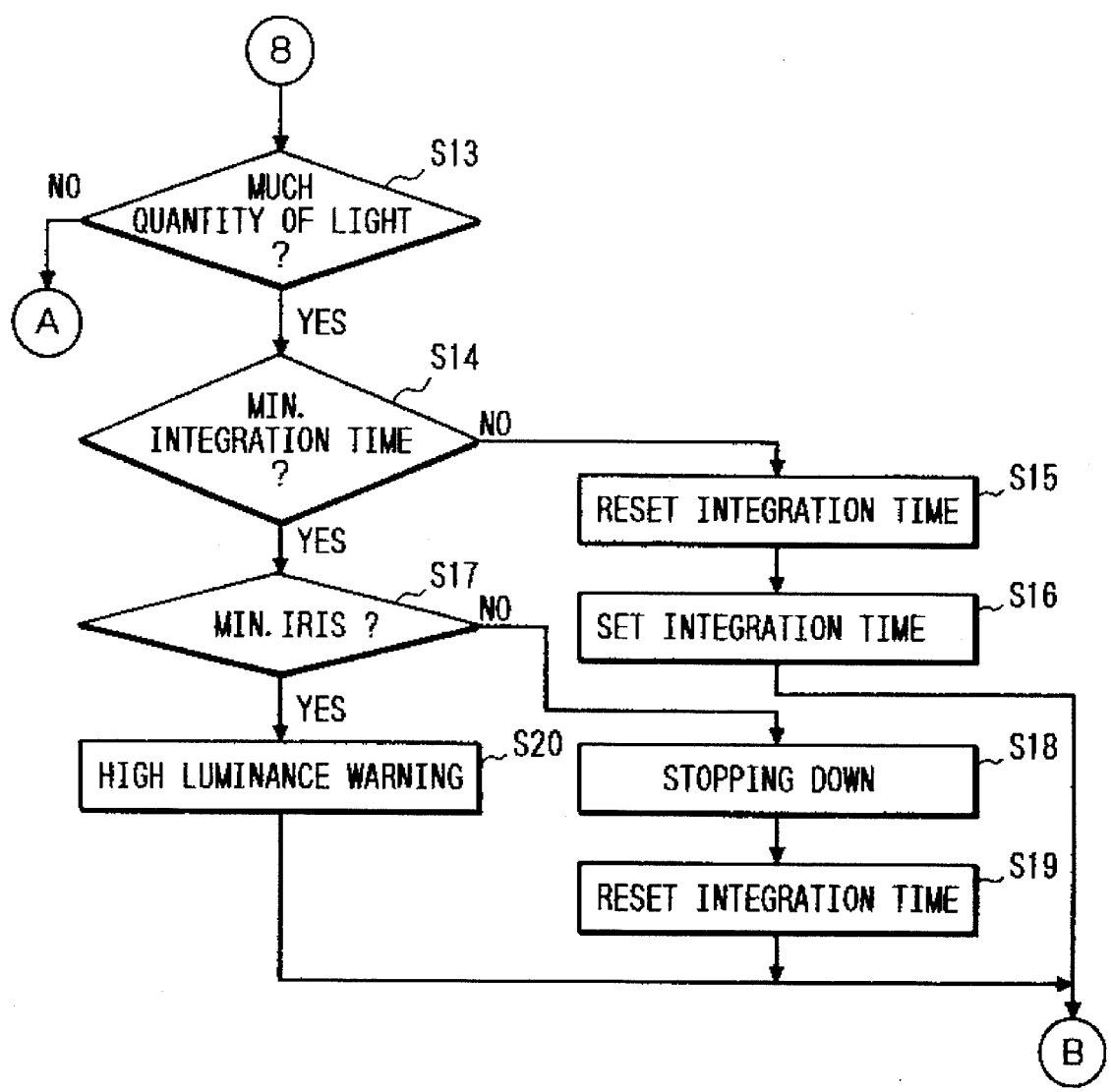
FIG. 25 is a flow chart showing a processing operation of the image pickup apparatus shown in FIG. 24.
Figure 26:
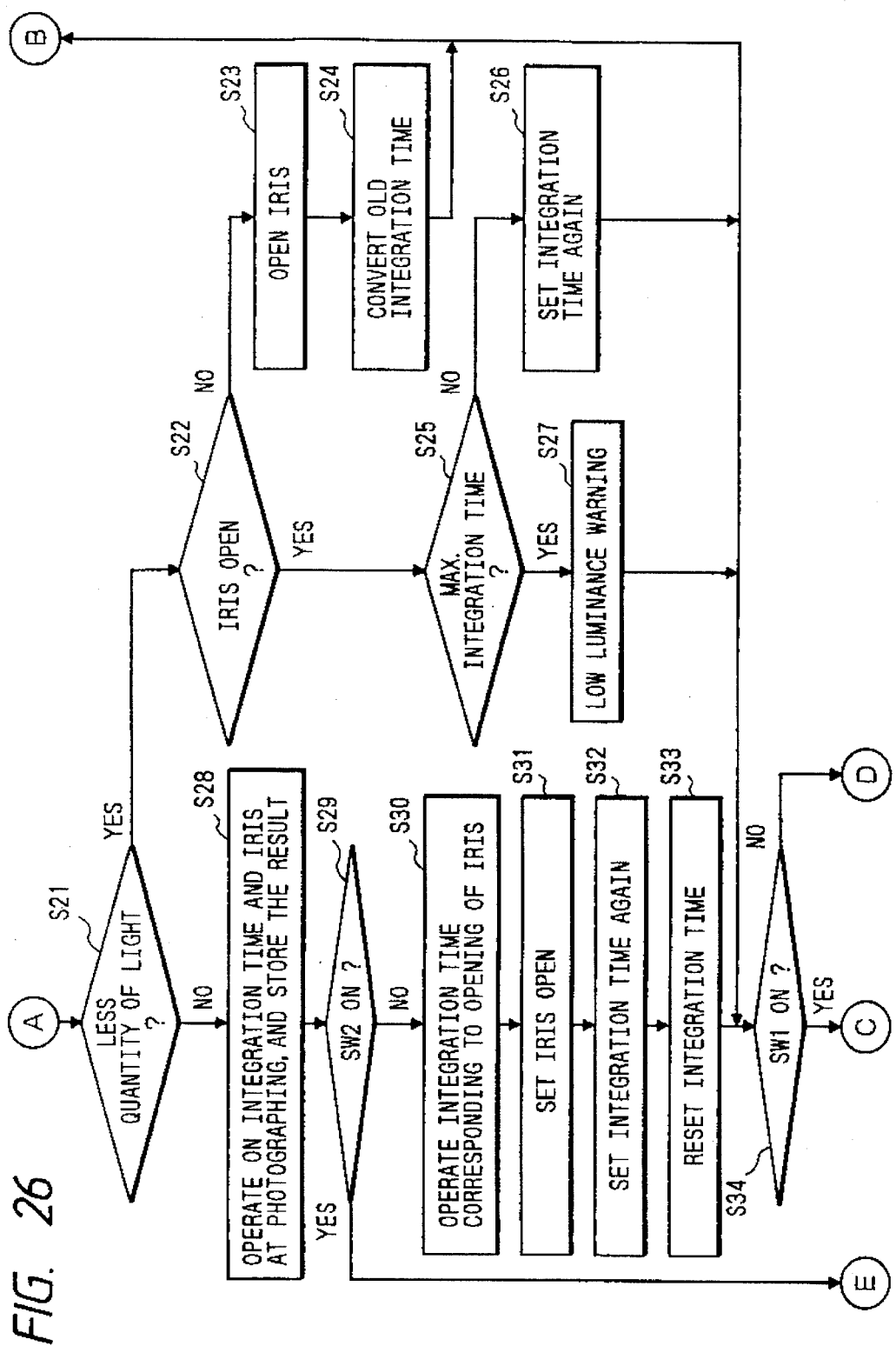
FIG. 26 is a flow chart showing another processing operation of the image pickup apparatus shown in FIG. 24.
Figure 27B:
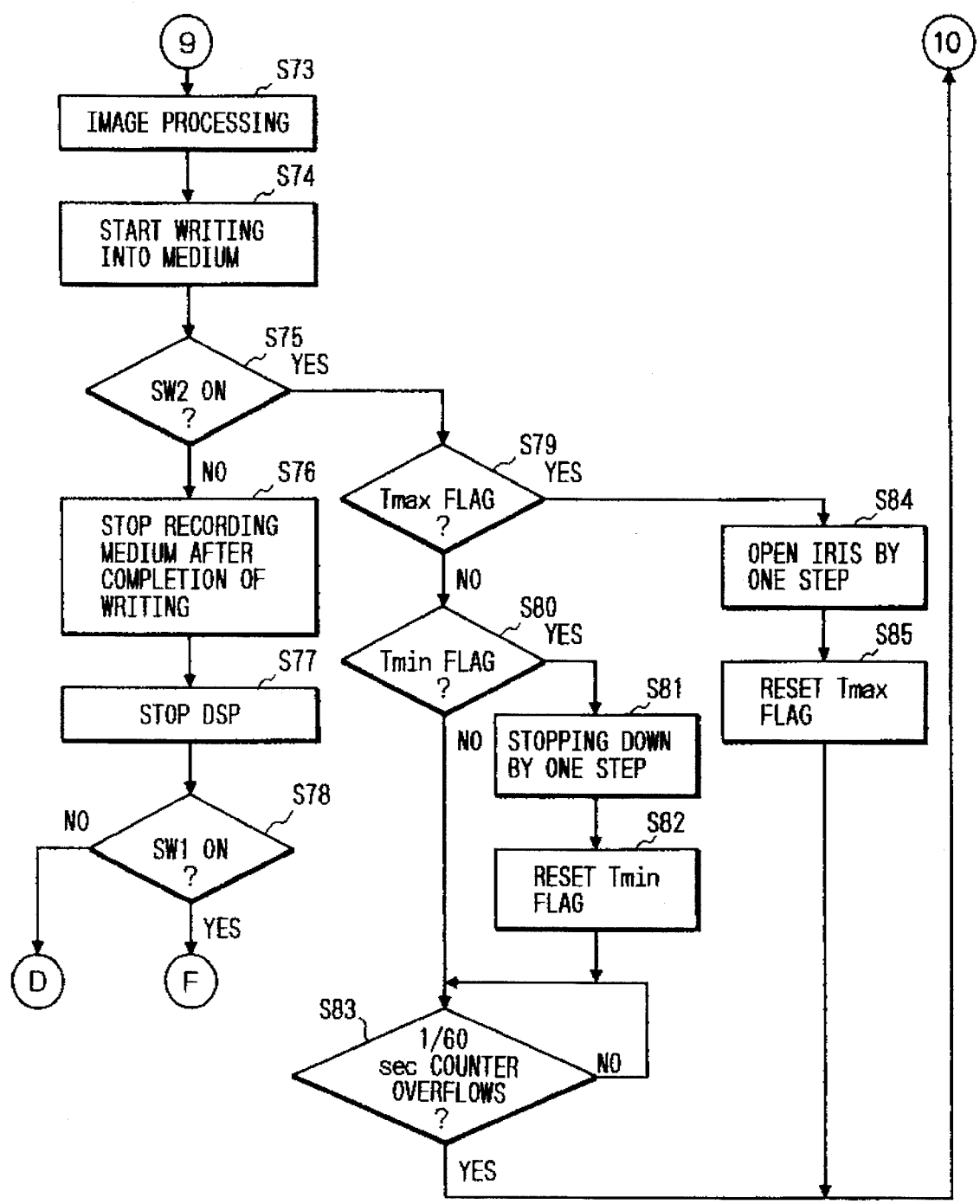
FIG. 27 is a flow chart showing still another processing operation of the image pickup apparatus shown in FIG. 24.

The eighth embodiment according to the present invention will be described with reference to FIGS. 24 to 27. The eighth embodiment exemplifies an operation for continuously reading image data. FIG. 24 is a block diagram of the eighth embodiment, and FIGS. 25 to 27 are flow charts for explaining processing operations of an image pickup apparatus shown in FIG. 24.

The same reference numerals as in the fourth embodiment denote the same parts and functions in the arrangement (FIG. 24) of the eighth embodiment, and a detailed description thereof will be omitted. Referring to FIG. 24, the image pickup apparatus includes a continuous image pickup digital signal processor (to be referred to as a DSP hereinafter) 40, a recording circuit (REC) 41 for recording image data processed by the DSP 40 in a recording medium 42, an image pickup element 3, an A.D converter 6, and a synchronization signal generator (to be referred to as an SSG hereinafter) 43 for generating sync signals and clocks which are required to operate the image pickup element 3, the A.D converter 6, the DSP 40, and the like.

The image pickup apparatus also includes a system controller 44 for controlling the overall system of the image pickup apparatus and a driver (DRV) 45 for driving the recording medium 42. The driver 45 moves a recording head (not shown) relative to the recording medium 42 and shifts a recording area. In the following description, these driving operations are referred to as medium driving.

Operations of the image pickup apparatus shown in FIG. 24 will be described with reference to flow charts in FIGS. 25 to 27. Since the operations in the flow charts in FIGS. 25 and 26 are the same as those in FIGS. 15 and 16 except for processing associated with auxiliary light, only different parts will be described below.

In the fourth embodiment, measurement of an object luminance is performed in the DSP 8. However, in the eighth embodiment, the measurement of the object luminance is performed by an integrator 10. As a result, setting of the DSP mode (S8) during the photometry time interval in FIG. 15 is omitted. In addition, at the end of the image pickup processing time interval (i.e, a time interval from a node E (S60) in FIG. 27 to detection of the OFF state of a switch SW2 in step S77), the recording medium can be stopped (S76), and at the same time, the DSP 41 can also be stopped (S77).

As a result, power consumption can be reduced. In addition, resetting of the integration time in steps S15, S19, and S33 is not associated with the contents of the internal resistor of the DSP 41, but the contents of a resistor 16, as a matter of course.

When the ON state of the switch SW2 is detected upon photometry before the recording operation, as shown in FIGS. 25 and 26 (S29 in FIG. 26), the recording medium 42 is driven (S60 in FIG. 27).

Subsequently, the iris value is set to be a value calculated in the photometry (S61). The iris is open larger than that in actual exposure to shorten the photometry time during photometry in the same manner as in the fourth embodiment.

Subsequently, the SSG 43 is shifted from the photometry mode to the recording mode (S62) to set the DSP 40 in the recording mode (S63). As briefly described also with reference to the fourth embodiment, only photometry is performed during the ON period of a switch SW1, and no data in units of pixels are required. A memory 7, an adder 18, the DSP 40, the recording circuit 41, the medium 42, and the driver 45 for the medium 42 are not required.

These circuits are powered off during the photometry time interval and are powered again synchronously with a change in mode of the SSG 43 and mode setup of the DSP 40. The above circuits are also powered off synchronously upon the stop of the DSP 40 (S77), thereby further reducing the power consumption.

A 1/60 sec counter is reset to start time measurement (S64). In this embodiment, this counter serves as a timer for setting a time interval of continuously receiving image data. In the eighth embodiment, a one-frame image is received within 1/60 sec, but this time interval can be arbitrarily determined.

In this case, although the maximum integration time is set equal to the image receiving interval (if interlaced read-out or subsampling is not performed during reception of the image), the maximum integration time can be arbitrarily determined within the image reception time interval. The 1/60 sec counter is reset (S64), and at the same time the image pickup apparatus is cleared to start exposure (S65). All the pixels of the image pickup element 3 are repeatedly read out simultaneously with the start of exposure, and data are added in units of pixels by the adder 18, thereby storing the sums in the memory 7. At the same time, the data are integrated by the integrator 10. The integration result is compared with a predetermined value stored in a register 11 by a comparator 12, and exposure continues until the integration value exceeds the predetermined value.

Meanwhile, the system controller 44 repeatedly monitors an output from the comparator 12 (S66) and a maximum integration time timer (S70). When the integration value exceeds the predetermined value and a signal representing an appropriate exposure value is output from the comparator 12 (YES in step S66), the system controller 44 determines whether the integration time is less than the shortest integration time (S67).

This determination operation is performed to assure at least a necessary time for reading out all the pixels for integration for photometry and to obtain iris control data for the next image reception. When the exposure time is to be controlled by a mechanical member (so-called optical shutter), although it is not arranged in this embodiment, the shortest exposure time which suppresses exposure irregularity below a predetermined value is present. The above processing is executed to cope with use of the above mechanical member.

As in this embodiment, when an exposure time control system uses an electronic shutter, the limit of the shortest exposure time can be eliminated. However, even in this case, the system controller 44 must determine whether the integration time exceeds the shortest integration time so as to obtain iris control data for the next image reception. In this embodiment, if the integration time is less than the shortest integration time (i.e., YES in step S67), a $T_{min}$ flag is set (S68). After a lapse of the minimum exposure time from the start of exposure (i.e., a time required for reading out all the pixel at least once) (S69), signal processing such as matrix processing, γ-correction processing, and compression processing is performed (S73) while data are kept read out from the memory 7. Recording of the image on the medium 42 is started by the recording circuit 41 (S74). This recording need only be completed before the next image is read out and signal processing for that data is started.

When the integration time is more than an the shortest integration time (NO in step S67), the system controller 44 waits until the one-frame cycle of repeated read-out of the pixel image data is completed (S72). Thereafter, the same signal processing (S73) as that for the integration time less than the minimum integration time is performed (S73).

When the integration value is not set to be an optimal value through the loop of steps S66 and S70 within the maximum integration time (i.e., when an output is generated by the comparator 12), the system controller 44 determines in step S70 that the integration time exceeds the maximum integration time (YES in step S70). A $T_{max}$ flag is set (S71), and the system controller 44 waits for completion of read-out of one frame (S72). The same signal processing as that for the integration time less than the minimum integration time is performed (S73).

By these processing operations (S66 to S74), when the pixel data of one frame which are obtained after the integration value reaches the predetermined value are added to the corresponding pixel data stored in the memory 7, and when read-out is completed, the read-out operation of the image pickup element 3 is stopped. One-frame image data written in the memory 7 is subjected to signal processing in the DSP 40 (S73), and at the same time, the processed data start to be written on the medium 42 (S74).

Thereafter, the ON/OFF state of the switch SW2 is checked (S75). If the switch SW2 is determined to be OFF, after the one-frame signal-processed image data added in units of pixels are completely written on the medium, the recording medium is then stopped (S76), and at the same time, the DSP 40 is stopped. The flow then returns to the photometry routine shown in FIGS. 25 and 26. A return position in FIG. 25 varies depending on the state of the switch SW1 (S78). More specifically, when the switch SW1 is ON, the flow returns to step S7 in which the mode of the SSG 43 is set to the photometry again. However, when the switch SW1 is OFF, the flow returns to step S58 in which the SSG 43 is stopped, and then to processing in which an external interruption is permitted (S59) to stop the system.

Although not illustrated in the flow charts, necessary blocks are powered off to detect the next external interruption. If the switch SW2 is ON in step S75, the $T_{max}$ and $T_{min}$ flags are checked (S79 and S80). If neither the $T_{max}$ nor $T_{min}$ flags are set, the system controller 44 waits an overflow of the 1/60 sec counter set in step S64 so as to obtain a predetermined image reception interval (S83). The flow returns to processing of resetting the 1/60 sec counter (S64).

When the $T_{max}$ flag is set (YES in step S79), the iris is opened by one step (S84), and at the same time the $T_{max}$ flag is reset (S85). The flow immediately returns to step S64 for resetting the 1/60 sec counter. Since the $T_{max}$ flag has been set, the system controller 44 need not wait for an overflow of the 1/60 sec counter to obtain a predetermined image reception interval.

When the $T_{max}$ flag is not set and the $T_{min}$ flag is set, the iris is stopped down by one step (S81), and the $T_{min}$ flag is reset (S82). Thereafter, the system controller 44 waits for an overflow of the 1/60 sec counter as in the case wherein neither $T_{min}$ nor $T_{max}$ flags are set (S83). The flow returns to step S64 for resetting the 1/60 sec counter.

Processing for controlling the iris by one step, which is performed when the $T_{max}$ or $T_{min}$ flag is set, can be developed to change the width (speed) for controlling the iris in accordance with the length of integration time (exposure end time), as a matter of course. These processing operations (S64 to S75 and S79 to S85) are repeated until the switch SW2 is turned off. When the maximum integration time is detected in step S25, low luminance warning is performed (S27).

In this embodiment, since the reference pixels for photometry are all pixels, when a one-frame read-out cycle upon detection of the appropriate exposure amount by the integration value is completed, all the pixels need not be subjected to read access after the appropriate exposure amount is detected. This can be applied not only to this embodiment in which image data are continuously received, but also to the fourth embodiment in which each one-frame image data is received.

According to this embodiment, values of all pixels of the image pickup element 3 are repeatedly read out from the start of exposure for obtaining a luminance value of an object image, and the read-out data are added in units of pixels by the adder 18, and the sums are stored in the memory 7. At the same time, the values of all the pixels are integrated by the integrator 10. An appropriate exposure amount is detected in accordance with the integration value.

However, the read-out operation of pixel data from the image pickup element until the appropriate exposure amount is detected can be performed as follows to obtain the same effect as described above. Data of some pixels (but not all pixels) are repeatedly read out, and the read-out data are accumulated and stored, while they are integrated by the integrator to detect an exposure amount. After the appropriate exposure amount is detected, data of all the pixels are read out and stored in the memory, while the pixel data already read out and accumulated in units of pixels at the time of detection of the appropriate exposure amount are added to the corresponding current data and the sums are stored in units of pixels.

When an arrangement as in the fourth embodiment wherein pixel data is multiplied with coefficients at the input terminal of the integrator 10 in units of pixels while changing the coefficients is adopted, weighting for photometry can be performed in accordance with the position on the frame, as a matter of of course.

The respective embodiments of the present invention have been described independently of each other. It is possible to combine the fifth embodiment shown in FIG. 21, the sixth embodiment shown in FIG. 22, the seventh embodiment shown in FIG. 23, and the eighth embodiment shown in FIG. 24. The following arrangements (1) to (7) as developed forms of the respective embodiments can also be obtained.

(1) In the fourth embodiment shown in FIG. 13, the integrator 10, the adder 18, the register 11, and the digital comparator 12 are arranged independently of each other. However, since these circuits are digital processing circuits, they may be arranged integrally with the DSP 8 or on a single chip, thereby further reducing the cost.

(2) The memory 7 or 19 need not be a perfect random access memory, but can be a FIFO memory in which write and read start addresses can be set. In this case, the capacity of the memory can be reduced.

(3) Since the read-out rate of the existing image pickup element and the processing speed of the existing signal processing system are low, it is difficult to widen the integration area for photometry. In order to minimize this drawback, it is effective to employ a means for setting an integration area every predetermined number of lines in place of the integration area constituted by the adjacent scanning lines shown in FIG. 17.

(4) As a matter of course, if an image pickup element capable of selecting read-out pixels in units of pixels can be realized, the integration area for photometry can be dispersed in units of pixels.

(5) According to the present invention, although a so-called electronic shutter for starting exposure upon clearing of the image pickup element is used, a mechanical shutter may be used in place of the electronic shutter. However, if a mechanical shutter is employed, an operation delay may occur. In this case, a better result can be obtained when the value corresponding to a level for detecting the end of exposure is set smaller than the integration value.

(6) The normal order of reading out signals from the image pickup element is a downward order, i.e., an order from the top (top edge) to the bottom (tail edge). However, in consideration of integration for photometry, when a read-operation of scanning lines is started from the bottom (tail edge) to expose the scanning lines of the bottom portion (tail edge) earlier than those of the top portion (top edge), an integration start timing can be advanced and a shorter exposure time (earlier integration end time) can be obtained because the integration area for photometry is often set in a portion below the center (i.e., in order to prevent an adverse influence because the top edge is brighter than the average level).

The reverse read-out order is compatible with write access to the memory 7, read access from the memory 7, internal processing in the DSP 8, or the write access to the memory card 17 when the order is reversed again.

(7) When some or all the data of all pixels are to be integrated while the data of all the pixels serving as the reference pixels are stored in the memory 7, a general FIFO can be utilized as the memory 7 in place of a RAM.

In all embodiments described above, clearing of the memory 7, the memory card 17, and the memory 19 has not been described, but it is apparent that clearing is performed immediately before the exposure (i.e., the same timing as clearing of the image pickup element).

In each embodiment described above, a means for repeatedly reading out some or all the image data from the image pickup means during the exposure time interval is arranged. The read-out data are integrated during the exposure time interval to measure an exposure amount. An exclusive photometry sensor need not be arranged, and a simple arrangement can achieve low cost and compactness. In addition, the simple arrangement can cope with changes in object luminances upon the start of exposure, and can be used for auxiliary light emission control at a low object luminance, so that an appropriate object image can always be obtained.

What is claimed is:

1. An image pickup apparatus comprising:
   (a) image pickup means for converting an optical image into an electrical signal and for periodically outputting the electrical signal;
   (b) A/D converting means for converting the electrical signal into a digital image signal;
   (c) adding means for adding the digital image signals converted by said A/D converting means and;
   (d) exposure control means for controlling an exposure condition of said image pickup means according to a level of a signal added by said adding means.

2. An image pickup apparatus according to claim 1, wherein said exposure control means controls an accumulation period of said image pickup means.

3. An image pickup apparatus according to claim 2, wherein said exposure control means stops an accumulation operation of said image pickup means.

4. An image pickup apparatus according to claim 3, wherein said exposure control means stops the accumulation operation of said image pickup means when the level of the signal added by said adding means reaches a predetermined level.

5. An image pickup apparatus according to claim 1, further comprising an illumination means for illuminating an object to be image picked up.

6. An image pickup apparatus according to claim 5, wherein said exposure control means controls an illuminating operation of said illuminating means.

7. An image pickup apparatus according to claim 6, wherein said exposure control means stops the illuminating operation when the level of the signal added by said adding means reaches a predetermined level.

8. An image pickup apparatus comprising:
   (a) image pickup means for converting an optical image into an electrical signal and for outputting said electrical signal plural times;
   (b) A/D converting means for converting the electrical signal into a digital image signal;
   (c) adding means for adding the digital image signals converted by said A/D converting means and;
   (d) exposure control means for controlling an exposure condition of said image pickup means according to a level of a signal added by said adding means.

9. An image pickup apparatus according to claim 8, wherein said exposure control means controls an accumulation period of said image pickup means.

10. An image pickup apparatus according to claim 9, wherein said exposure control means stops an accumulation operation of said image pickup means.

11. An image pickup apparatus according to claim 10, wherein said exposure control means stops the accumulation operation of said image pickup means when the level of the signal added by said adding means reaches a predetermined level.

12. An image pickup apparatus according to claim 8, further comprising an illumination means for illuminating an object to be image picked up.

13. An image pickup apparatus according to claim 12, wherein said exposure control means controls an illuminating operation of said illuminating means.

14. An image pickup apparatus according to claim 13, wherein said exposure control means stops said illuminating operation when the level of the signal added by said adding means reaches a predetermined level.

15. An image pickup apparatus according to claim 8, wherein said exposure control means stops an outputting operation of said image pickup means when the level of the signal added added by said adding means reaches a predetermined level.

16. An image pickup apparatus according to claim 8, wherein said exposure control means stops an adding operation by said adding means when the level of the signal added by said adding means reaches a predetermined level.

17. An image pickup apparatus comprising:
   (a) image pickup means for converting an optical field image into an electrical field image signal and for outputting the electric field image signal plural times;
   (b) A/D converting means for converting said electrical field signal into a digital field image signal;
   (c) adding means for adding said digital field image signals converted by said A/D converting means; and
   (d) exposure control means for controlling an exposure condition of said image pickup means according to a level of the field image signals added by said adding means.

18. An image pickup apparatus according to claim 17, wherein said exposure control means controls an accumulation period of said image pickup means.

19. An image pickup apparatus according to claim 18, wherein said exposure control means stops an accumulation operation of said image pickup means.

20. An image pickup apparatus according to claim 19, wherein said exposure control means stops the accumulation operation of said image pickup means when the level of the field image signals added by said adding means reaches a predetermined level.

21. An image pickup apparatus according to claim 17, further comprising an illumination means for illuminating an object to be image picked up.

22. An image pickup apparatus according to claim 21, wherein said exposure control means controls an illuminating operation of said illuminating means.

23. An image pickup apparatus according to claim 22, wherein said exposure control means stops said illuminating operation when the level of the field image signals added by said adding means reaches a predetermined level.

24. An image pickup apparatus according to claim 17, wherein said exposure control means stops an outputting operation of said image pickup means when the level of the field image signals added by said adding means reaches a predetermined level.

25. An image pickup apparatus according to claim 17, wherein said exposure control means stops an adding operation by said adding means when the level of the field images signals added by said adding means reaches a predetermined level.

* * * * *

UNITED STATES PATENT AND TRADEMARK OFFICE
CERTIFICATE OF CORRECTION

PATENT NO. : 5,585,942

DATED : December 17, 1996

INVENTOR(S): Makoto Kondo

It is certified that error appears in the above-identified patent and that said Letters Patent is hereby corrected as shown below:

Title page,

AT [56] FOREIGN PATENT DOCUMENTS
"89095771 6/1982 Japan
 89015375 1/1983 Japan" should read
--82-095771 6/1982 Japan
 83-015735 1/1983 Japan--.

COLUMN 2
  Line 40, "which changes such as are which flickers,"
    should read --which changes, e.g., which flickers,--.

COLUMN 4
  Line 66, "out it" should read --it out--.

COLUMN 6
  Line 27, "a much quantity of light" should read
    --too much--.
  Line 30, "a less quantity of light" should read
    --too little--.

COLUMN 15
  Line 36, "courters)" should read --counters)--.

COLUMN 16
  Line 40, "a much quantify of light" should read
    --too much--.
  Line 47, "a much quantify of light" should read
    --too much--.

COLUMN 19
  Line 63, "include" should read --inside--.

UNITED STATES PATENT AND TRADEMARK OFFICE
CERTIFICATE OF CORRECTION

PATENT NO. : 5,585,942

DATED : December 17, 1996

INVENTOR(S) : Makoto Kondo

Page 2 of 2

It is certified that error appears in the above-identified patent and that said Letters Patent is hereby corrected as shown below:

COLUMN 27
 Line 34, "an" should be deleted.

COLUMN 31
 Line 17, "added added" should read --added--.

Signed and Sealed this

Twenty-ninth Day of July, 1997

Attest:

BRUCE LEHMAN

*Attesting Officer*

*Commissioner of Patents and Trademarks*